United States Patent
Imai et al.

(10) Patent No.: US 8,239,864 B2
(45) Date of Patent: Aug. 7, 2012

(54) PORTABLE TERMINAL VARYING MANAGEMENT OF TASK GROUP IN TIME BASED ON RECEIVED EXECUTION REQUEST OF TASK GROUP AND WEAK TASK GROUP

(75) Inventors: Akira Imai, Hino (JP); Yasuhiko Abe, Niiza (JP); Shinichi Shishino, Oume (JP)

(73) Assignee: Fujitsu Toshiba Mobile Communications Limited, Kawasaki (JP)

( * ) Notice: Subject to any disclaimer, the term of this patent is extended or adjusted under 35 U.S.C. 154(b) by 1332 days.

(21) Appl. No.: 11/731,849

(22) Filed: Mar. 30, 2007

(65) Prior Publication Data
US 2008/0005738 A1    Jan. 3, 2008

(30) Foreign Application Priority Data

May 23, 2006 (JP) ................................ P2006-142730

(51) Int. Cl.
*G06F 9/46* (2006.01)
*H04M 3/00* (2006.01)
(52) U.S. Cl. ........ 718/100; 718/102; 718/103; 718/106; 455/418
(58) Field of Classification Search .................. None
See application file for complete search history.

(56) References Cited

U.S. PATENT DOCUMENTS

| | | | | |
|---|---|---|---|---|
| 5,428,789 A * | 6/1995 | Waldron, III | ................. | 718/103 |
| 6,442,436 B1 * | 8/2002 | Nogami | ......................... | 700/19 |
| 6,567,840 B1 * | 5/2003 | Binns et al. | .................. | 718/103 |
| 6,912,712 B1 * | 6/2005 | Myung | ......................... | 718/101 |
| 7,334,229 B1 * | 2/2008 | McDonald et al. | ........... | 718/104 |
| 7,451,445 B1 * | 11/2008 | Eppstein | ....................... | 718/100 |
| 7,721,286 B2 * | 5/2010 | D'Souza | ....................... | 718/100 |
| 7,809,363 B2 | 10/2010 | Nishida | | |
| 2003/0046324 A1 * | 3/2003 | Suzuki et al. | ................. | 709/100 |
| 2003/0061260 A1 * | 3/2003 | Rajkumar | ..................... | 709/104 |
| 2003/0084086 A1 * | 5/2003 | Simpson et al. | .............. | 709/102 |
| 2004/0181791 A1 * | 9/2004 | Hayashi | ........................ | 718/100 |
| 2005/0183086 A1 * | 8/2005 | Abe et al. | ....................... | 718/100 |
| 2006/0095916 A1 * | 5/2006 | Nishida | ........................ | 718/100 |

FOREIGN PATENT DOCUMENTS

JP    2005-228144 A    8/2005
JP    2006-127208      5/2006

OTHER PUBLICATIONS

Office Action issued in Japanese Application No. 2006-142730 mailed Mar. 13, 2012.

* cited by examiner

*Primary Examiner* — Emerson Puente
*Assistant Examiner* — Charles Swift
(74) *Attorney, Agent, or Firm* — Maschoff Gilmore & Israelsen

(57) ABSTRACT

According an aspect of the invention, a mobile terminal includes a task executing unit configured to execute a plurality of task groups and a management unit configured to manage to execute in a first order the task groups. If the task executing unit executes a first task group in foreground and if the management unit receives a first request executing a second task group different from the first task group, the management unit manages the first and the second task groups as one chain and executes the second task group in foreground. If the task executing unit executes the first task group in foreground and if the management unit receives a second request executing a third task group different from the first and second task groups, the management unit manages the first and third task groups as other chain and executes the third task group in foreground.

14 Claims, 30 Drawing Sheets

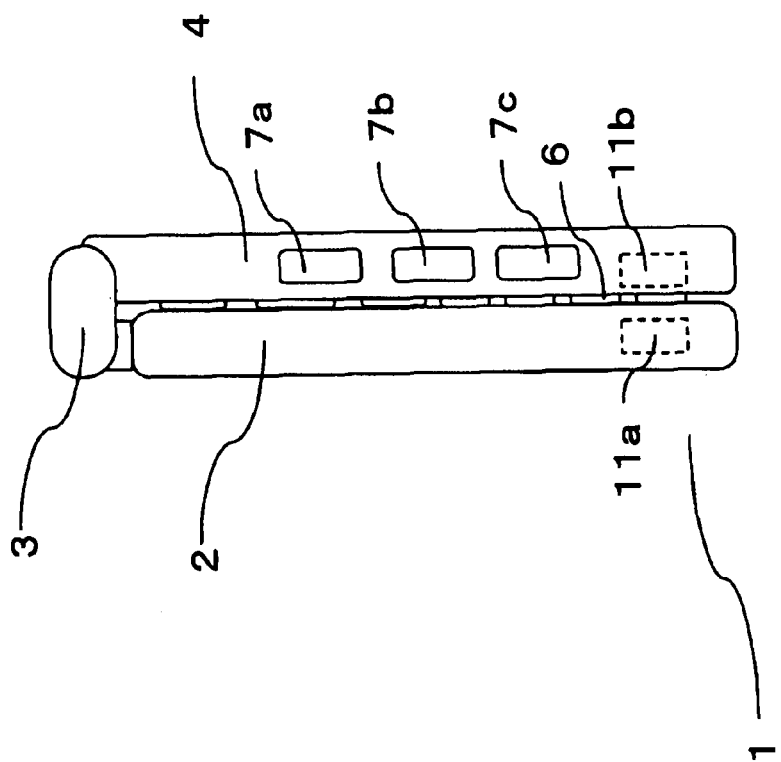
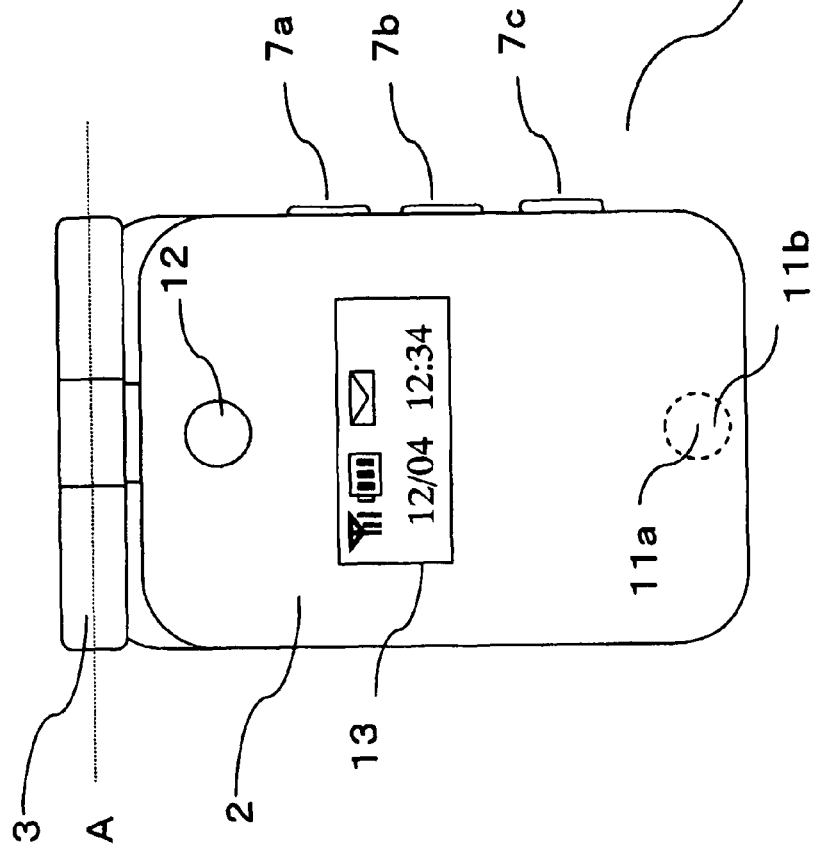

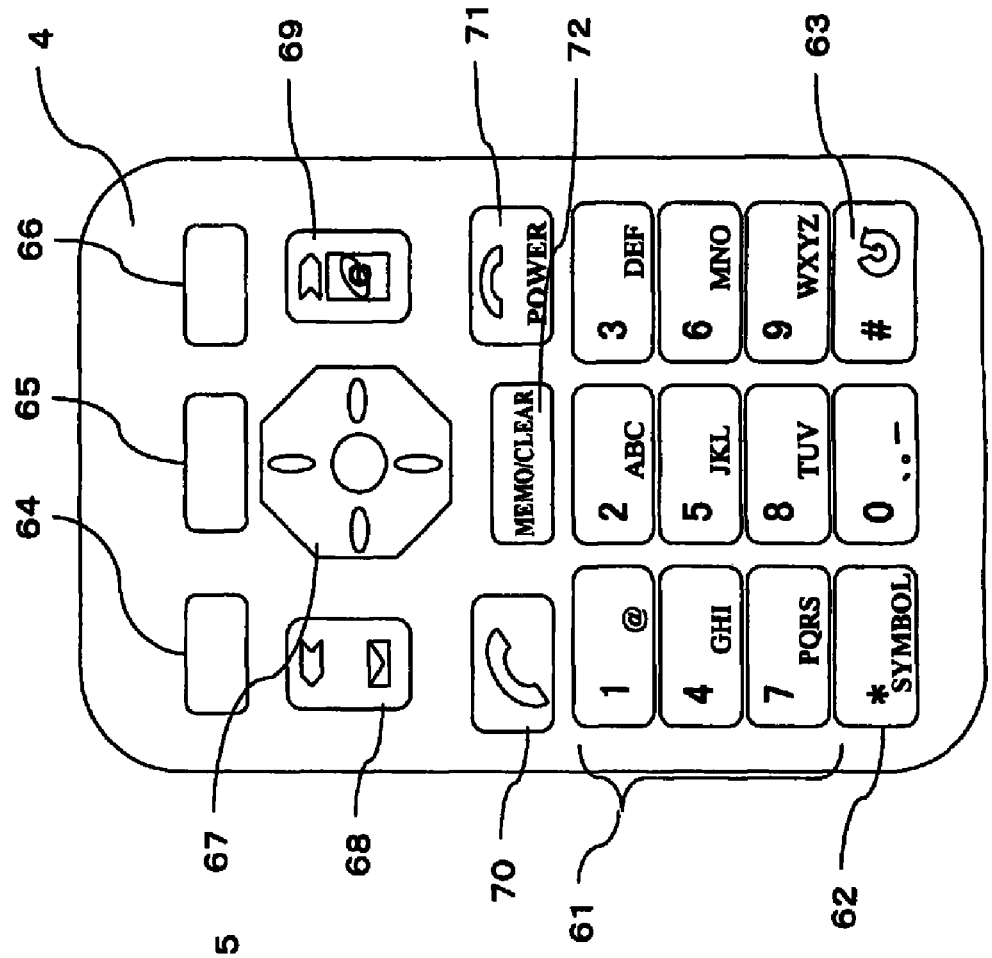
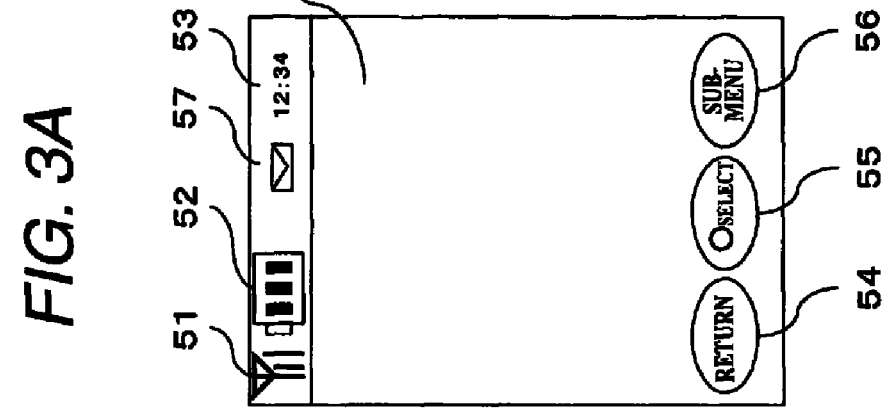

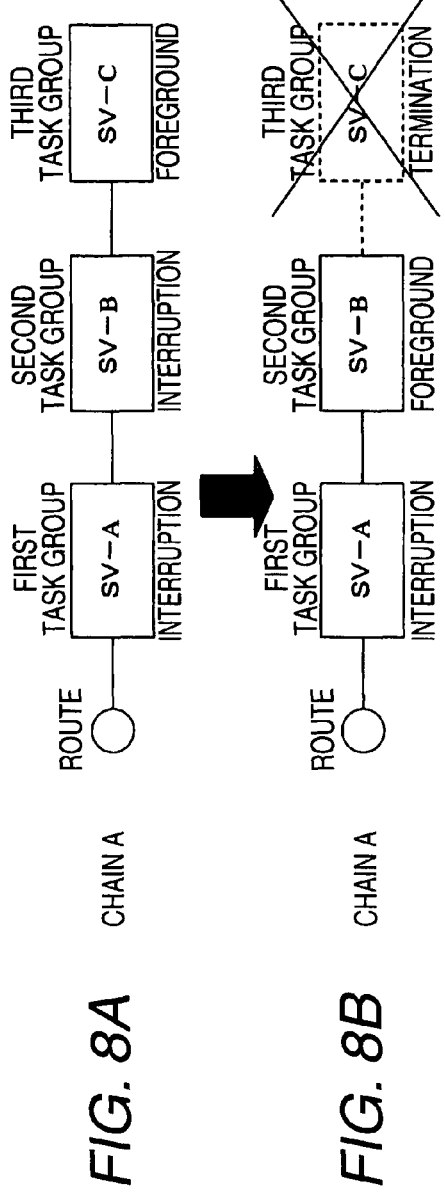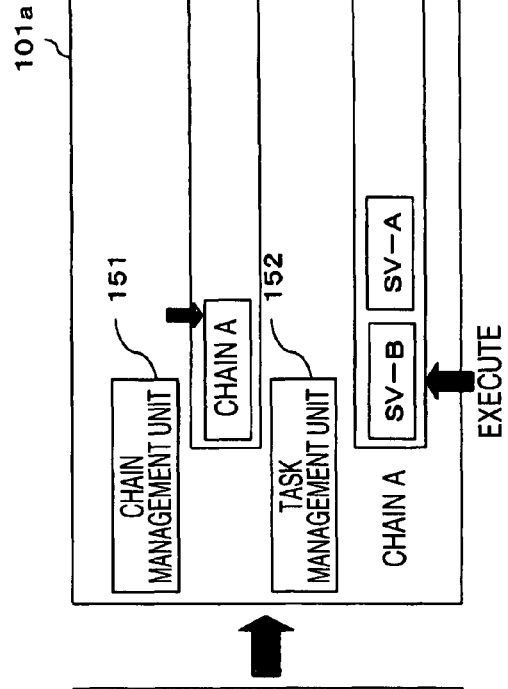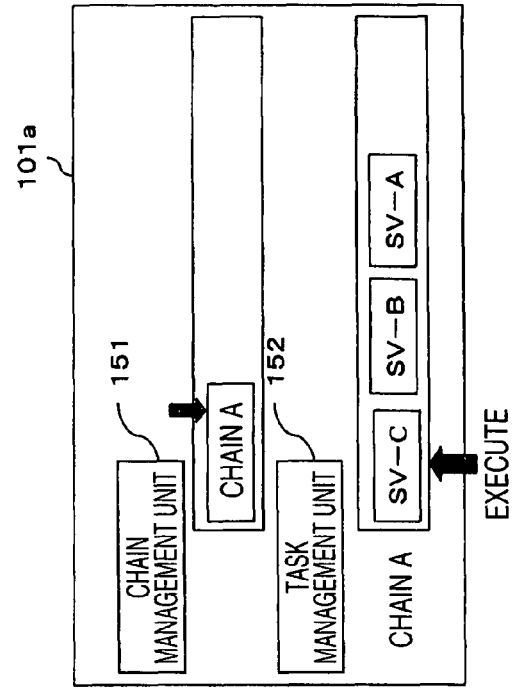

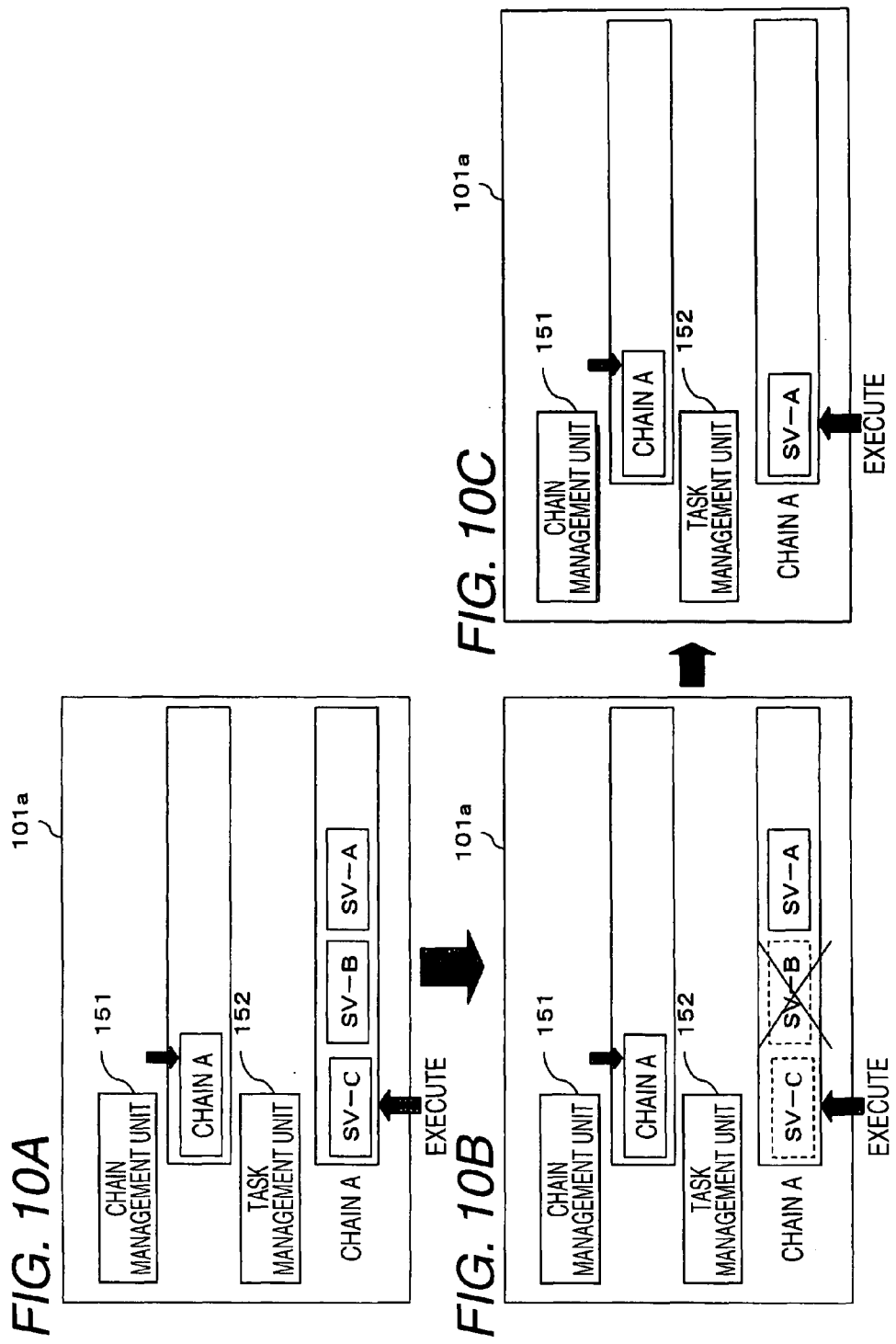

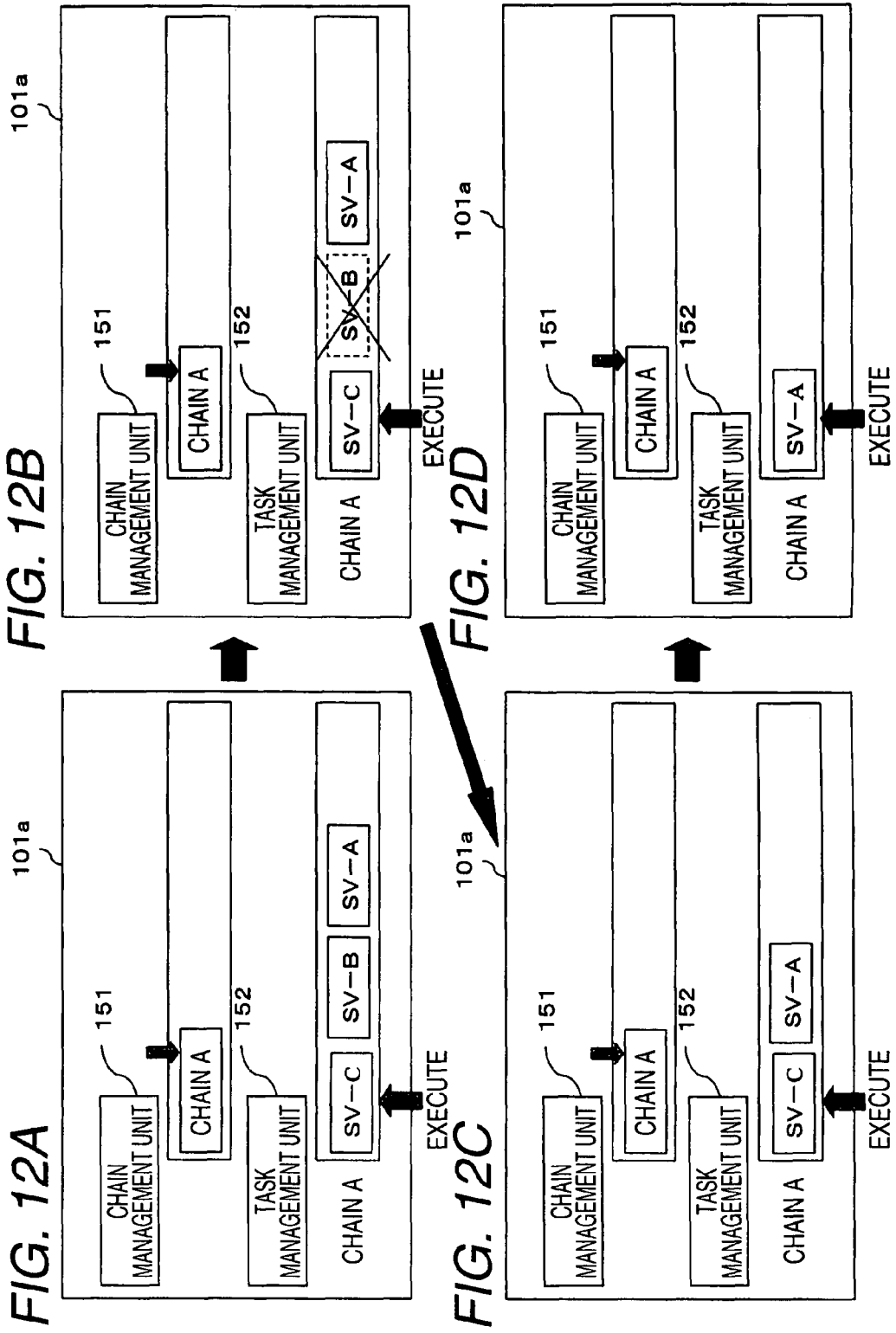

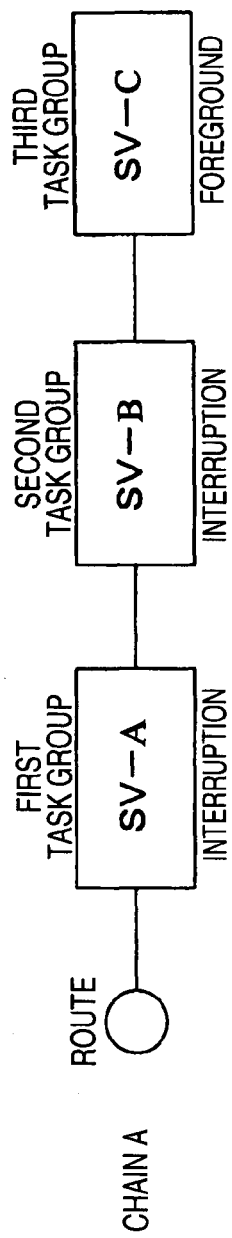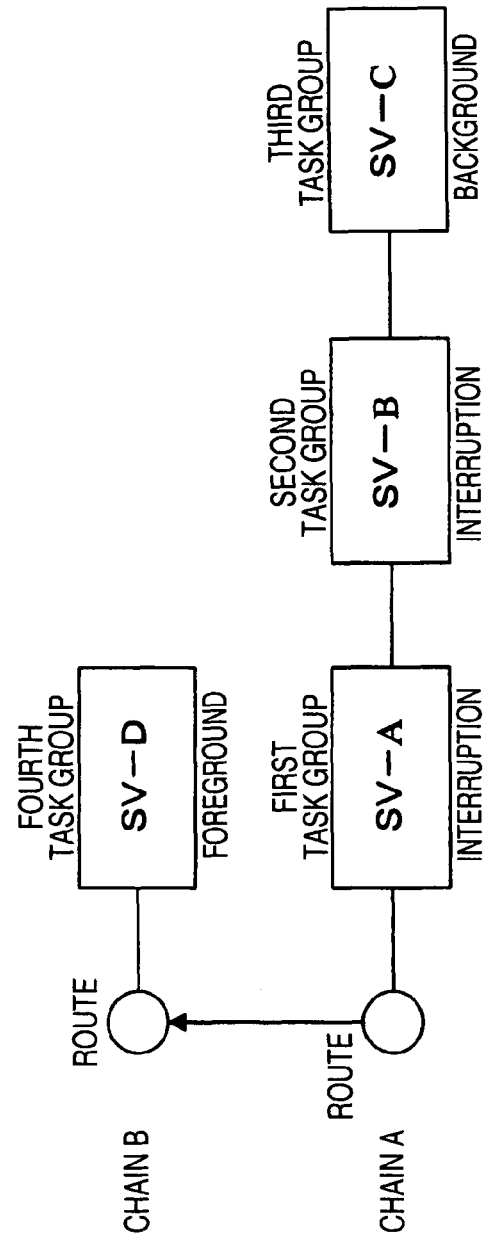
FIG. 13A
FIG. 13B

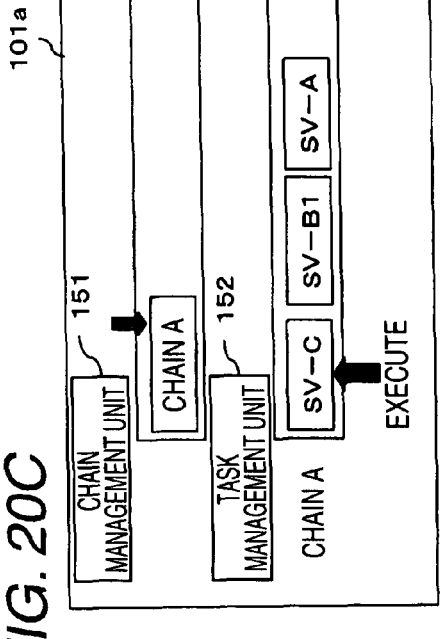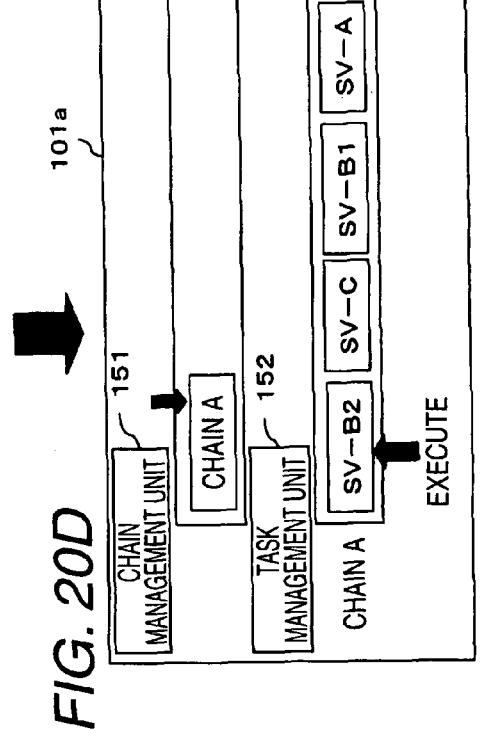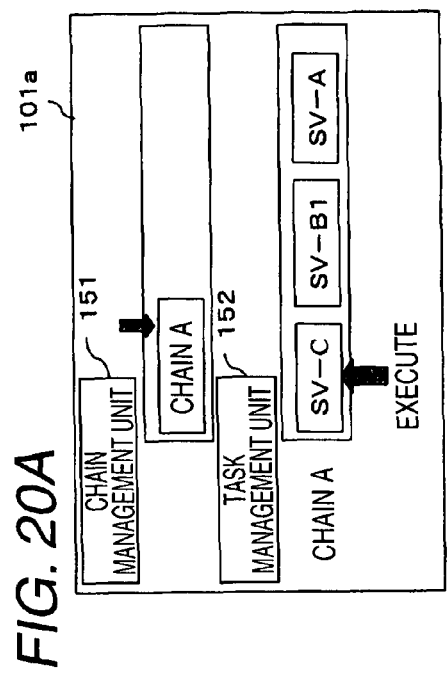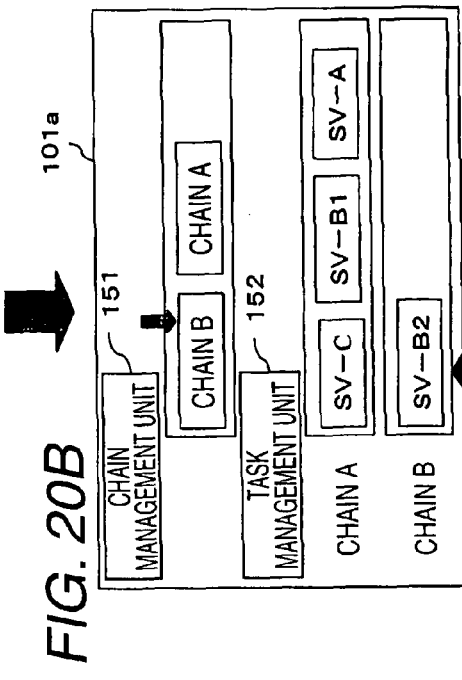

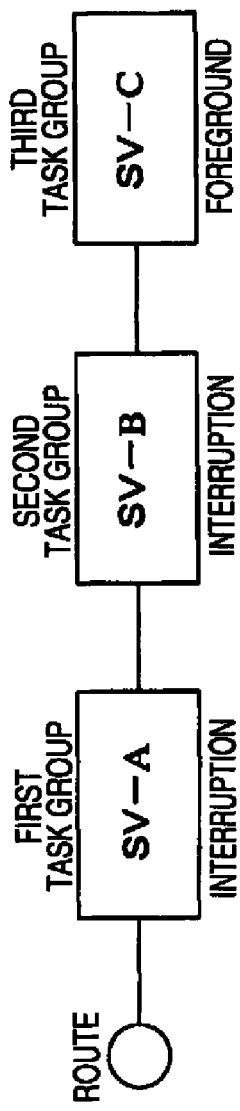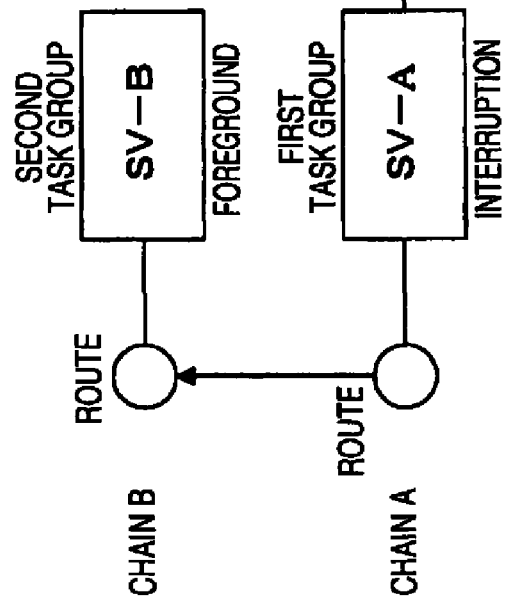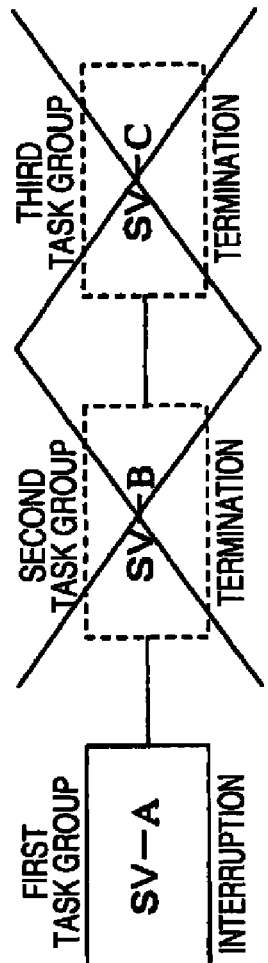
FIG. 21A
FIG. 21B

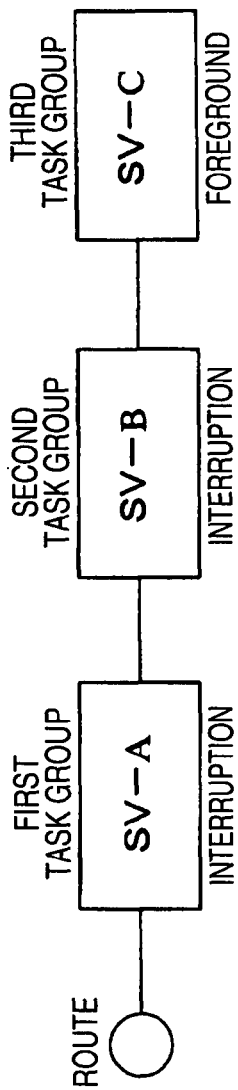
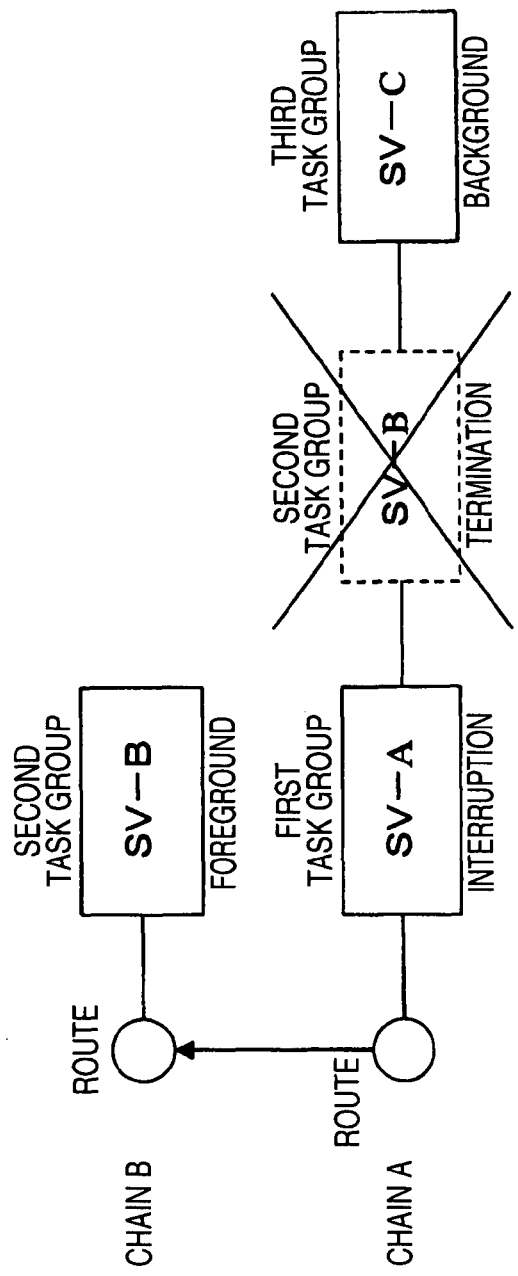
FIG. 25A
FIG. 25B

PORTABLE TERMINAL VARYING MANAGEMENT OF TASK GROUP IN TIME BASED ON RECEIVED EXECUTION REQUEST OF TASK GROUP AND WEAK TASK GROUP

CROSS-REFERENCE TO RELATED APPLICATIONS

This application is based on and claims the benefit of priority from the prior Japanese Patent Application No. 2006-142730, filed on May 23, 2006; the entire contents of which are incorporated herein by reference.

BACKGROUND

1. Technical Field

The present invention relates to a mobile terminal.

2. Description of Related Art

Recently, mobile information devices have been considerably progressed and used. Software of the mobile terminal generally manages every task or every task group constituted by the plurality of tasks. For example, there is a technology in which the task group and a function of a mobile terminal are managed as one-to-one and a priority is assigned to the function when a plurality of functions are executed (for example, See JP-A-2005-228144 at pages 3 to 10 and FIG. 2).

SUMMARY

The present invention has been made in view of the above circumstances and provides a terminal mobile. According an aspect of the invention, there is provided a mobile terminal including: a task executing unit configured to execute a plurality of task groups; and a management unit configured to manage to execute in a first order the plurality of task groups that are executed by the task executing unit. If the task executing unit executes a first task group in foreground and if the management unit receives a first request for executing a second task group that is different from the first task group, the management unit manages the first task group and the second task group as one chain including the first task group and the second task group and executes the second task group in foreground. If the task executing unit executes a first task group in foreground and if the management unit receives a second request for executing a third task group that is different from the first task group and the second task group, the management unit manages the first task group and the third task group as other chain and executes the third task group in foreground.

BRIEF DESCRIPTION OF THE DRAWINGS

In the accompanying drawings;

FIGS. 2A and 2B are exemplary diagrams illustrating the configuration of the cellular phone 1 in its closed state;

FIGS. 3A and 3B show an example of a display screen of a display 5 of the cellular phone 1 and an example of a layout of keys 6 of the cellular phone 1, respectively;

FIGS. 8A to 8D are exemplary third diagrams for explaining a case of activating a new service having the strong correlation;

FIGS. 10A and 10C are exemplary fifth diagrams for explaining a case of activating a new service having the strong correlation;

FIGS. 12A and 12D are exemplary seventh diagrams for explaining a case of activating a new service having the strong correlation;

FIGS. 13A and 13B are exemplary first diagrams for explaining operations of a case of activating a new service having a weak correlation;

FIGS. 20A to 20D are exemplary second diagrams for explaining operations of multiple activation of the service;

FIGS. 21A and 20B are exemplary third diagrams for explaining operations of multiple activation of the service;

FIGS. 25A and 25B are exemplary seventh diagrams for explaining operations of multiple activation of the service;

DESCRIPTION OF THE EMBODIMENTS

Hereinafter, an embodiment of the invention will be described.

Figure 4:
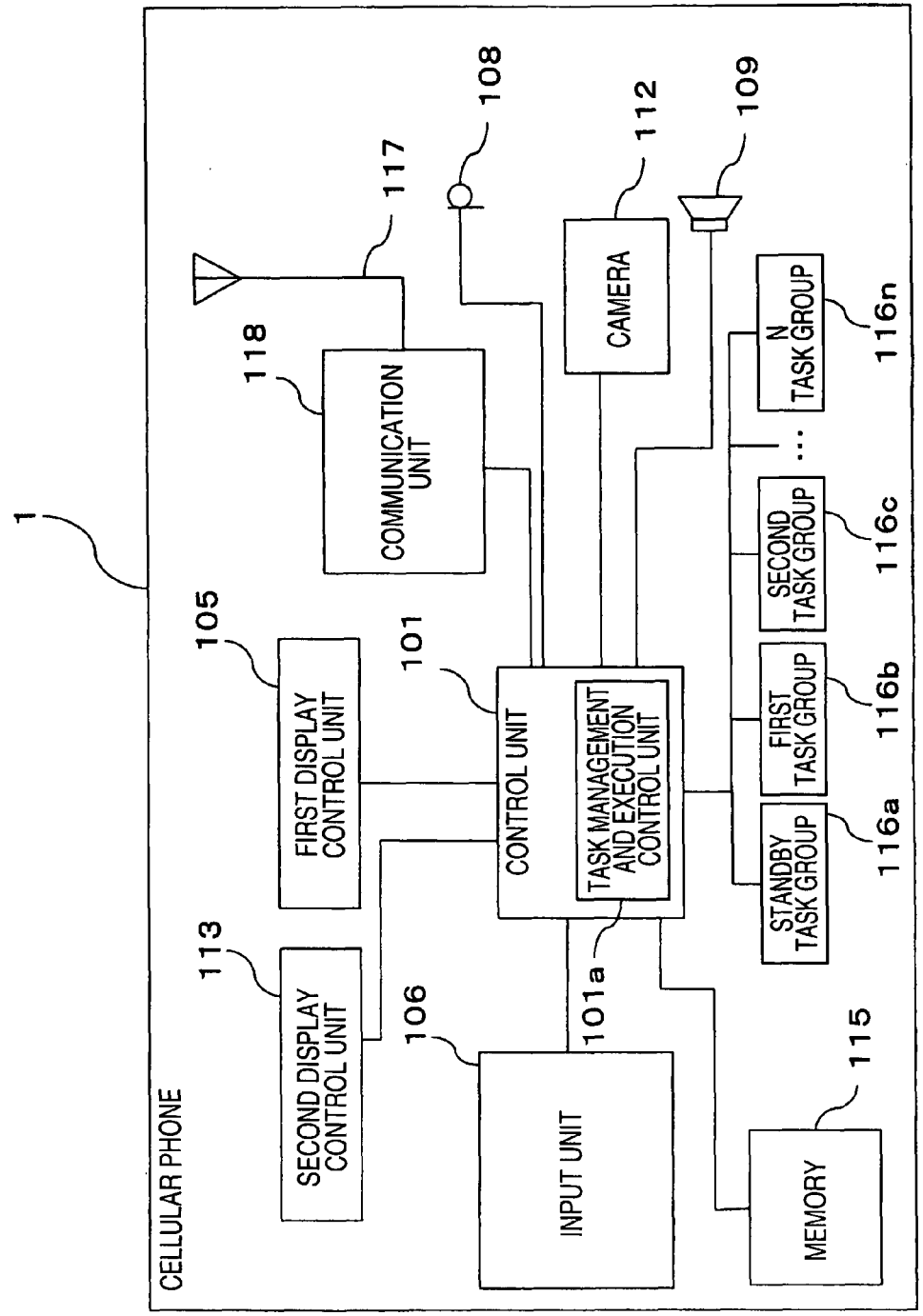
FIG. 4 is an exemplary simplified block diagram illustrating the configuration of the cellular phone 1.

Hereinafter, a cellular phone according to an embodiment of the invention will be described with reference to accompanying drawings. FIGS. 1 and 2 show an exterior appearance of a cellular phone 1, and FIG. 4 is a block diagram illustrating the cellular phone 1.

Figure 1A:
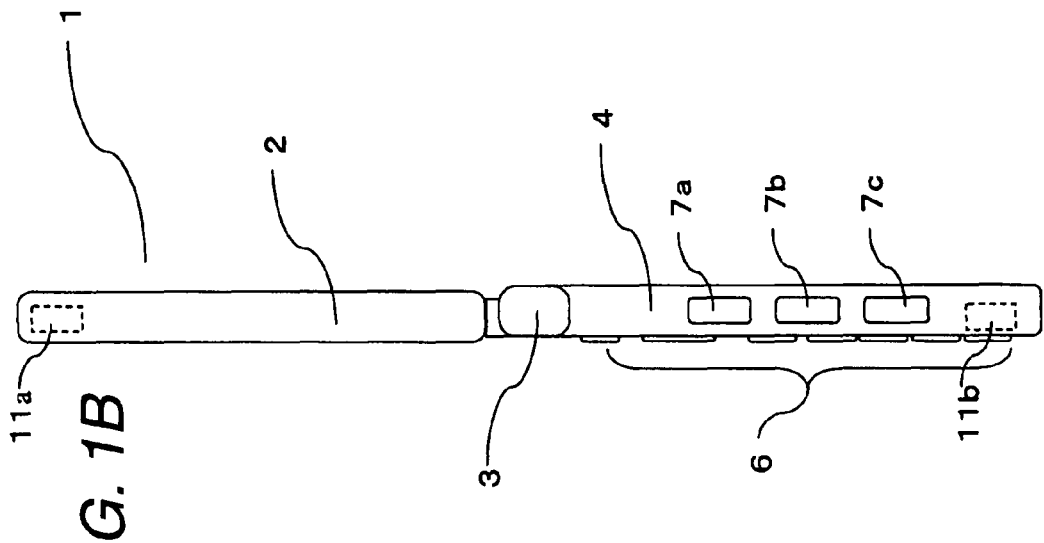
FIGS. 1A and 1B are exemplary diagrams illustrating a configuration of a cellular phone 1 in its open state with an angle of 180°.
Figure 1B:
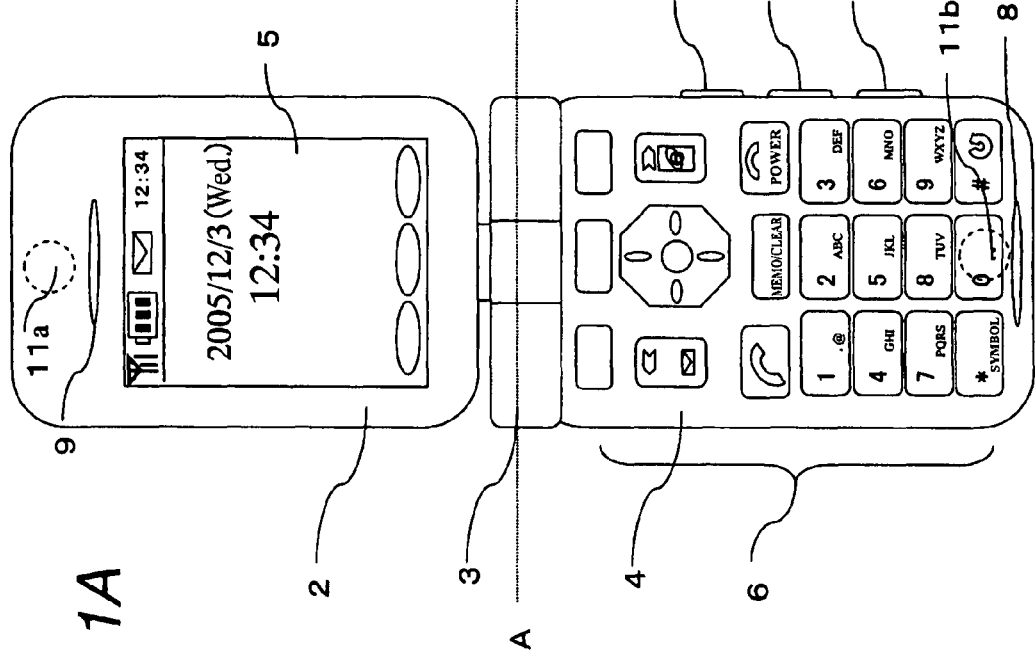

First, a configuration of the cellular phone 1 will be described with reference to FIGS. 1A, 1B, 2A, and 2B. FIGS. 1A and 1B show the exterior appearance of the cellular phone 1 in its open state with an angle of about 180°. FIG. 1A is a front view thereof and FIG. 1B is a side view thereof.

Next, FIGS. 2A and 2B show the exterior appearance of the cellular phone 1 in its close state. FIG. 2A is a front view thereof and FIG. 2B is a side view thereof.

In the cellular phone 1, an upper chassis unit 2 is connected to a lower chassis unit 4 with a hinge unit 3 interposed therebetween. The upper chassis unit 2 has a display 5 such as LCD, a receiver 9 generating a received voice, a magnetic sensor 11a detecting a state of the cellular phone 1, a camera 12, and a sub-display unit 13. Further, the lower chassis unit 4 has keys 6 for inputting numerals, characters, an operation of the cellular phone 1, and the like, side keys 7a to 7c for operating the cellular phone 1, a microphone (mouthpiece) 8 for collecting voice, and a magnetic sensor 11b for detecting the state of the cellular phone 1.

FIG. 4 is a simplified block diagram illustrating the configuration of the cellular phone 1. In the cellular phone 1, there are provided a control unit 101 controlling the entire cellular phone 1; a memory 115 constituted by memories such as RAM, NAND, DRAM, SRAM and storing every kind of information data and the like; a first display control unit 105 displaying and controlling the display 5; a second display control unit 113 displaying and controlling the sub-display unit 13; an input unit 106 recognizing pressing of the keys 6 and the side keys 7; a communication unit 118 controlling wireless communication by using an antenna 117; and a standby task group 116a, a first task group 116b, a second task group 116c, . . . , and a N-th task group 116n executed by the control unit 101. Further, the control unit 101 controls the entire operations of the cellular phone 1, and includes a task management and execution control unit 101a which manages or instructs the standby task group 116a, the first task group 116b, the second task group 116c, and the N-th task group 116n.

The first display control unit 105 and the second display control unit 113 display and control the display 5 and the sub-display unit 13, respectively, and display and control display data outputted and instructed by the control unit 101.

The communication unit 118 has a function of transmitting information instructed by the control unit 101 by wireless communication and receiving information transmitted by a mail server by the wireless communication. Further, the communication unit 118 notifies a receiving call or performs the call by receiving a signal coming from a base station even when a call function is executed. When receiving a signal for a reception of an email or a signal for a receiving call, the communication unit 118 notifies the intention to the control unit 101.

The input unit 106 can recognize pressing of the keys 6 and the side keys 7 including numeral keys, character keys, function keys for starting or terminating a mail editing, and the like. Accordingly, the input unit 106 notifies the control unit 101 of identification signals identifying the keys in accordance with the keys 6 input by a user so that the control unit 101 starts the operation.

FIGS. 3A and 3B show an example of the display 5 and an example of an arrangement of the keys 6, respectively. As shown in FIG. 3A, in the uppermost line (hereinafter, referred to as an upper PICT line) of the display 5 in the cellular phone 1, there are an antenna PICT 51 for displaying the present reception level of the antenna 117, a battery PICT 52 for displaying present battery remains of the cellular phone 1, a time display 53 for displaying the present time, and a mail PICT 57 for displaying a received mail. Further, in the lowest line (hereinafter, referred to as a lower PICT line) of the display 5 in the cellular phone 1, there are a lower left PICT 54, a lower middle PICT 55, and a lower right PICT 56 for displaying brief descriptions of functions executed at the time of pressing the left soft key 64, the middle soft key 65, the right soft key 66 corresponding to the lower left PICT 54, the lower middle PICT 55, and the lower right PICT 56, respectively. For example, in a case where the PICTs are displayed on the screen as shown in FIG. 3A, a "Return" function is executed when the left soft key 64 is pressed, and a function focused at the present (not shown) can be selected when the middle soft key 65 is pressed. Further, a "sub-menu" is displayed on the screen when the right soft key 66 is pressed. The operation of the middle soft key 65 can be also performed by an OK key disposed at the center of the cross-shaped key 67

As shown in FIG. 3B, the lower chassis unit 4 has the keys 6 including the numeral keys 61, "*" key 62, and "#" key 63, the left soft key 64, the middle soft key 65, and the right soft key 66, the cross-shaped key 67, a mail key 68, a web browser key 69, a call key 70, a power key 71, and a clear key 72. Besides numerals, symbolic characters, alphabet characters, and the like are assigned to the numeral keys 61. For example, numeral "1" and symbols ".", and "@" are assigned to the numeral key "1" and the numeral "2" and alphabet characters "A", "B", "C", "a", "b", "c", and the like are assigned to the numeral key "2".

When the cross-shaped key 67 for moving a cursor in the up, down, right, or left directions is pressed and a portion (hereinafter referred to as the determination key) in the middle of it is pressed, various functions can be determined. Further, the mail key 68 can call a function to transmit and receive mails. The web browser key can be allowed to connect to Web and the like.

The call key 70 is used to receive or send a call and the power key 71 is used to turn ON or OFF, terminate a call, and terminate functions or editing. Further, the clear key 72 is used when the functions or editing are cleared and when characters are erased at the time of inputting the characters. When the clear key 72 is pressed at a standby display, a memo pad can be called.

Next, terminologies used in this specification will be described. First, a terminology "service (it may be also abbreviated as SV)" means software functions operated by a user's pressing of the keys 6 of the cellular phone 1. The software functions refer to a phone book function, menu-calling function, alarm function, web browser function, schedule function, shortcut function, music-producing function, TV phone function, TV watching function, terrestrial digital TV function, wireless LAN-connecting function, exterior apparatus-connecting function, or the like in a broad sense. Besides above-described functions, functions such as an alarm-representing function of the phone book, new phone book-making function, phone book-erasing function, and the like are included in a narrow sense (which means that function to call and execute the phone book functions in the subordinate menu are also included). Further, a communication standby, power ON/OFF, and the like are included in the concept of the service. A detailed explanation of those services is described above, and thus omitted. Further, those services are carried out by the standby 116a, the first task group 116b, . . . , the N-th task group 116n.

A terminology "task" refers to a task defined on an operating system (OS) of the cellular phone 1 and positioned on the application layer.

A terminology "service task" refers to a task which is activated to receive a control message of a management task to take charge of a service, among the task groups for providing services (for example, the standby task group 116a, the first task group 116b, the second task group 116c, . . . , and the N-th task group 116n in the case of the embodiment).

A terminology "foreground (foreground service)" refers to a service for activating services in a state a right capable of generally controlling the entire operation of the cellular phone 1 is retained. In principle, the foreground (foreground service) has a right to indicate a display or receive a key input. A terminology "background (background service)" refers to a service operated in a state restricted to a lower-ranked right than the foreground, and is allowed to operate some service, but controlled so that the foreground has a priority over the background in a right for indicating the display of the cellular phone 1, a right for receiving the key input, or the like.

A terminology "suspend (suspend service)" refers to a service for suspending the operation in the course of operating some service. Further, when the service receives an instruction to restart the operation from the task management and execution control unit 101a, the service is executed in foreground.

A terminology "idle" refers to a state activated and initialized as a task, but non-activated as a service.

A terminology "strong correlation" refers to a case that a newly activated service (SV-A) has a directly strong relation with the formerly activated service (SV-B) and that a service SV-B expects a return of information from a service SV-A. In other words, a newly activated service (SV-A) is activated in cooperation with the formerly activated service (SV-B). When the service (SV-A) terminates as a service, the service (SV-A) transmits an operating result to the service (SV-B) which requests an activation and terminates (clear).

A terminology "weak correlation" refers to a case that a newly activated service (SV-A) has no direct strong relation with the formerly activated service (SV-B) and that the service (SV-B) does not expect a return of information from the service SV-A. In other words, a newly activated service (SV-C) is activated independently from the service (SV-B). When the service (SV-C) terminates as a service, the service (SV-C) does not always transmit an operation result and is clear (or terminates).

A terminology "service chain" refers to a chain, which sequentially manages services that are to be operated together at once. The chain information is stored in the task management and execution control unit 101a (a chain management unit 151 described below, FIG. 6).

A terminology "route" refers to a concept for representing a point of the service chain.

Figure 5:
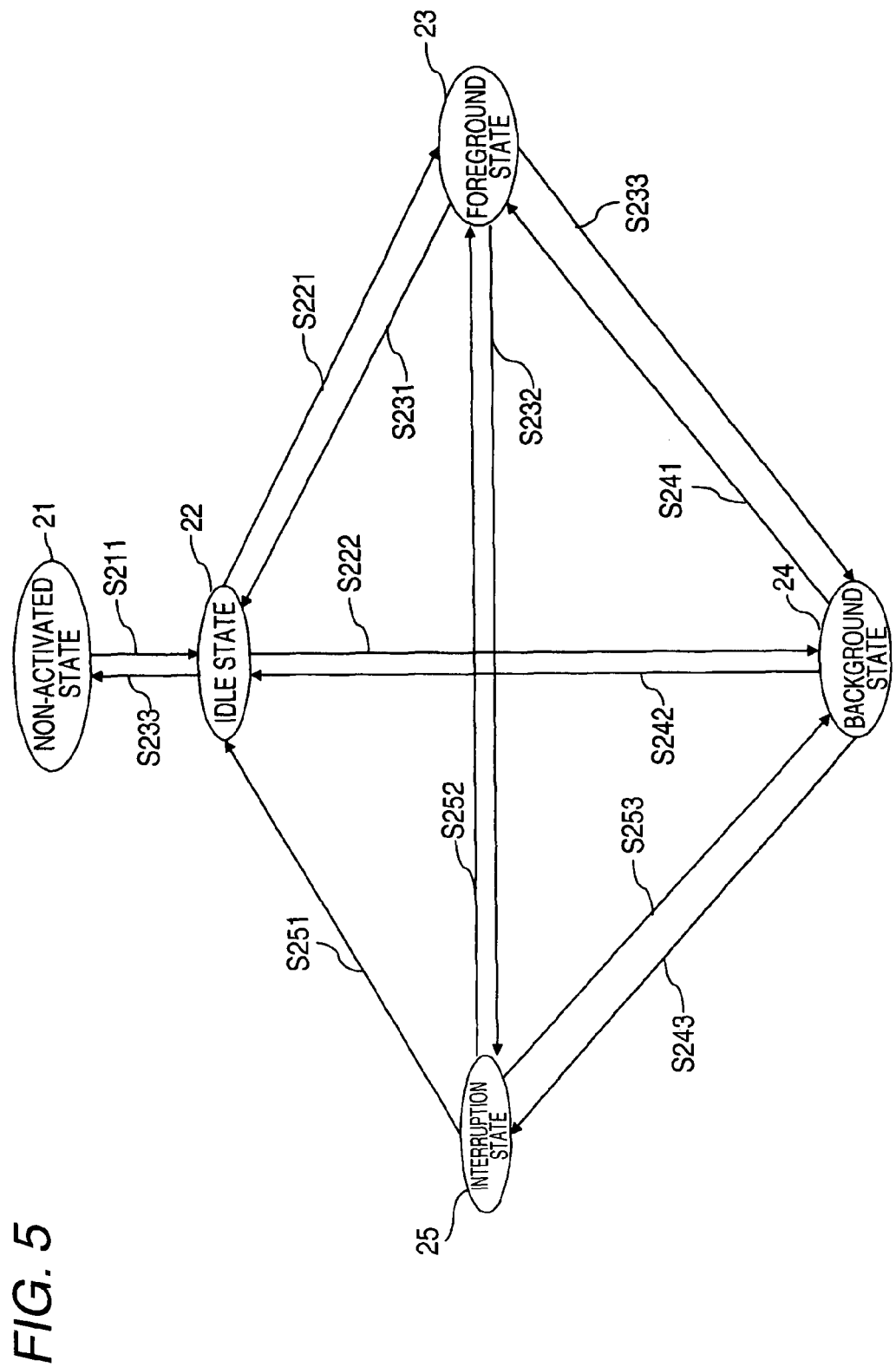
FIG. 5 is a exemplary diagram showing a relationship in which each task group of the cellular phone 1 is activated and then changed.

Next, with reference to the FIG. 5, it will be described that a state relation in which the standby 116a, the first task group 116b, . . . , the N-th task group 116n are activated and changed. Each task group is controlled by the task management and execution control unit 101a.

First, a service (for example, the N-th task group 116n) is changed from a non-activated state 21 to an idle state 22 when the power ON is operated by pressing the power key 71 by a user, for example (S211). Further, the service is changed from the idle state 22 to the non-activated state 21 when the power OFF is operated by long pressing the power key 71 by a user (S223).

In addition, when there is the receiving call from the exterior or a request for activating a service of an Mth task group 116m (including a case a user operates the keys 6 and other cases), the task management and execution control unit 101a is controlled to activate the corresponding service (for example, the N-th task group 116n). In this case, the task management and execution control unit 101a receives and activates the service in the foreground (S221) or the background (S222). Whether the service will be activated in the foreground or the background is determined and controlled by the task management and execution control unit 101a in accordance with rules described below.

In addition, in the course of activating the service in the foreground state 23, when the service is terminated (because it is unnecessary to activate the service any more), or when there is an instruction from the management task for forcibly terminating the service by a user's pressing of the keys 6 and the like, the service is terminated and returns to the idle state 22 (S231).

In the course of activating the service in the foreground state 23, when the service itself requests to activate another service having the strong correlation (where it is described in detail below), the service is changed to the suspend state 25 (S232). Further, when there is a request from the task management and execution control unit 101a for terminating the service, the service is changed to the suspend state 25 (S232).

In addition, in the course of activating the service in the foreground state 23, when there is a request from the task management and execution control unit 101a for changing to the background, the service is changed to the background state 24 (S233) Further, in the case where the service is being activated in the foreground state 23, when the service itself requests to activate another service having the weak correlation (where it is described in detail below), the service task is changed to the background state 24 (S233).

In the course of activating the service in the background state 24, when there is a request from the task management and execution control unit 101a for changing to the background, the service is changed to the foreground state 23 (S241).

In addition, in the course of activating the service in the background state 24, when the service is terminated (because it is unnecessary to activate the service any more), or when there is an instruction from the task management and execution control unit 101a for forcibly terminating the service by a user's pressing of the keys 6 and the like, the service is terminated and returns to the idle state 22 (S242).

When there is a further request from the task management and execution control unit 101a for terminating the service, the service is changed to the suspend state 25 (S243).

In addition, in the course of the suspend state 25 of the service, when the service is terminated (because it is unnecessary to activate the service any more), or when there is an instruction from the management task for forcibly terminating the service by a user's pressing of the keys 6 and the like, the service is terminated and returns to the idle state 22 (S251).

In the course of the suspend state 25 of the service, when there is a request from the task management and execution control unit 101a for restarting the service, the service is changed to the foreground state 23 (S252) and the background state 24 (S253), respectively. Further, when the service is restarted, the service is restarted from the state at the time of receiving the request for suspending the service before.

Next, with reference to FIGS. 6 to 29, an operation management of the services (the standby task group 116a, the first task group 116b, the second task group 116c, and the N-th task group 116n) performed by the task management and execution control unit 101a will be described.

FIGS. 6 to 12 are diagrams for explaining a case of activating a new service having the strong correlation. Thereafter, for example, when a service A (SV-A) of the first task group 116b is newly activated in the foreground state, a diagram shown in FIG. 6A is represented. Further, FIG. 6B is a diagram for explaining control information of the task management and execution control unit 101a. When the service SV-A is newly activated, the task management and execution control unit 101a registers a chain A in a task management unit 152. As shown in FIG. 6B, a service which must be performed in the present foreground state is represented as an arrow symbol, a chain registered as the highest priority in the chain management unit 151 (hereinafter, the chain represented in the most left) is performed. The service registered as the highest priority is performed in the chain registered in the task management unit 152 to be performed. In the example shown in FIG. 6B, the task management and execution control unit 101a executes and manages the service SV-A in the chain A.

Figure 6A:
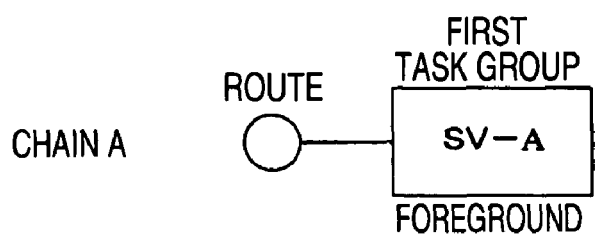
FIGS. 6A and 6B are exemplary first diagrams for explaining a case of activating a new service having a strong correlation.
Figure 6B:
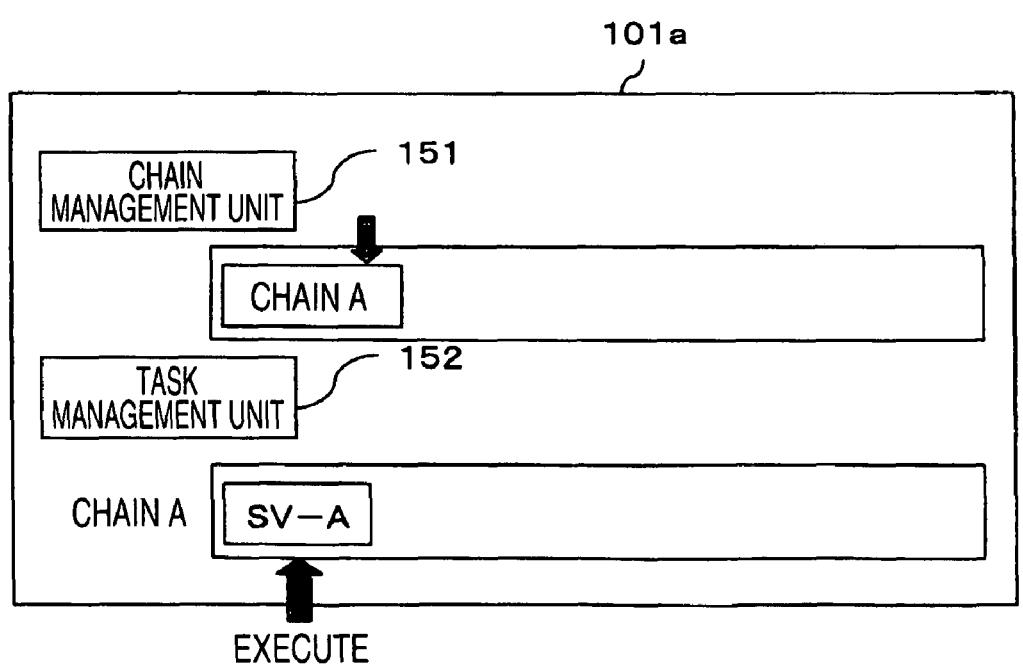
Figure 7A:
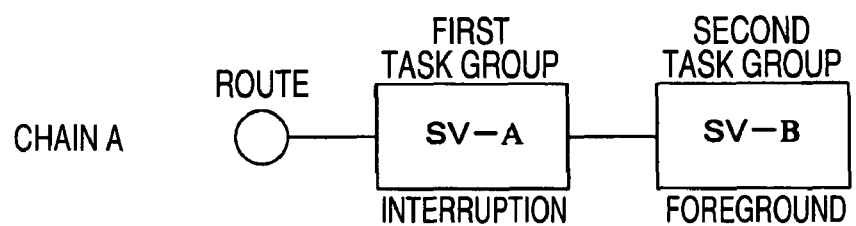
FIGS. 7A and 7B are exemplary second diagrams for explaining a case of activating a new service having the strong correlation.

FIG. 7A is a diagram showing a case where the service SV-B having the strong correlation is newly activated in a state that the service SV-A shown in FIG. 6A is activated in the foreground state. Specific examples are a case a camera function (SV-B) is activated in the course of writing the mail (SV-A), a case a phone book (SV-B) is activated in the course of a voice calling (SV-A), a case a display of mail writing (SV-B) is activated in the course of showing a schedule function (SV-A), and the like.

In the course that the service SV-A shown in FIG. 6A is activated in the foreground state, when there is an operation for activating the service SV-B by a user's pressing of the keys 6, for example, the task management and execution control unit 101a requests the first task group 116b to suspend the service (suspend of the service SV-A) and requests the second task group 116c to activate the service SV-B in the foreground state.

Figure 7B:
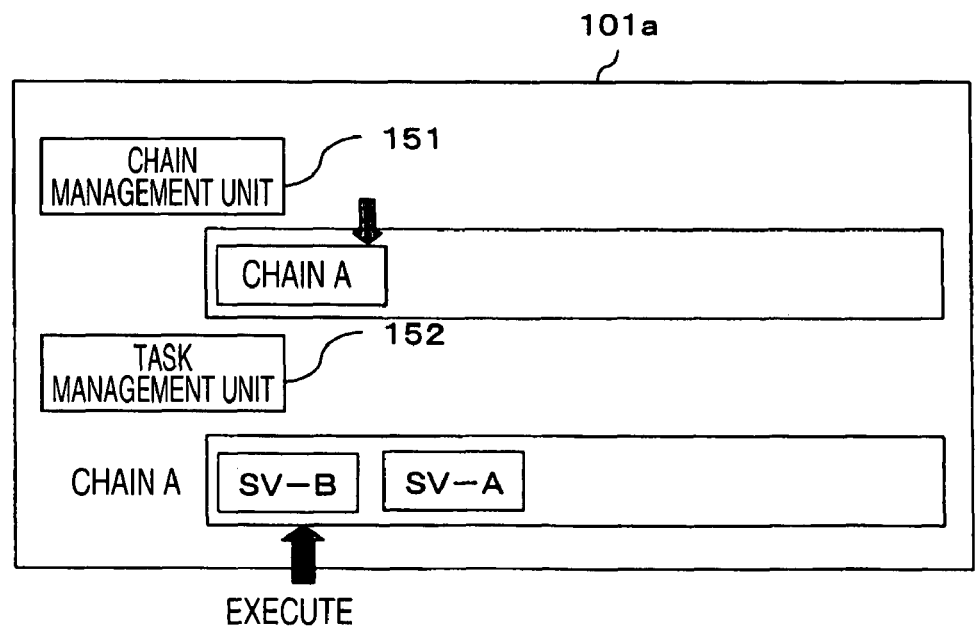

FIG. 7B is a diagram showing the management state of the task management and execution control unit 101a shown in FIG. 7A. The chain A is registered in the chain management unit 151 (where it is the same as the state shown in FIGS. 6A and 6B). Further, in the task management unit 152, the priority of the service SV-A drops down, and the services SV-B and SV-A are registered in the order of the high priority.

Next, operations at the time of activating the service activated in the foreground state will be described. FIG. 8A is a diagram showing a case where the service SV-C having the strong correlation is newly activated in the state that the service SV-B shown in FIG. 7A is activated in the foreground state, and then the service SV-A is suspended. FIG. 8B shows a case where the service SV-C is suspended from the above-described state. FIG. 8C is a diagram showing a management state of the task management and execution control unit 11a in the state shown in FIG. 8A. FIG. 8D is a diagram showing a management state of the task management and execution control unit 101a in the state shown in FIG. 8B. A specific example of termination of the service SV-C as shown in FIG. 8B is as follows. Even when the display of the mail writing service (SV-B) is activated at the time of displaying the schedule function in the calendar function (SV-A) and the function of the phone book (SV-C) is started, one mail address is selected and determined in the function of the phone book or the display of the function of the phone book is erased by pressing the clear key 72.

As shown in FIG. 8A, in the course of activating the service SV-B in the foreground state, when there is a request for activating the service SV-C having the strong correlation, the task management and execution control unit 101a requests to suspend the service SV-B and to activate the service SV-C in the foreground state similarly to the description described in FIGS. 7A and 7B. In this event, the chain A is registered in the chain management unit 151 as shown in FIG. 8C (where it is the same as the state shown in FIGS. 6 and 7). Further, the service SV-C is newly registered in the task management unit 152 and the priorities of the services SV-B and SV-A drop down. Accordingly, the services SV-C, SV-B, and SV-A are registered in the order of the high priority.

Thereafter, when the service SV-C is terminated in the state shown in FIG. 8A, the task management and execution control unit 101a receives a request for terminating the service SV-C from a third task group, and then requests to execute the service SV-B having one step lower priority than the second task group 116c in the foreground state. In this event, the task management and execution control unit 101a has already registered the chain A in the chain management unit 151 as shown in FIG. 8D and erases the service SV-C in the task management unit 152. Accordingly, the priorities of the services SV-B and SV-A go up, and thus the services SV-B and SV-A are registered in the order of the high priority.

Figure 9A:
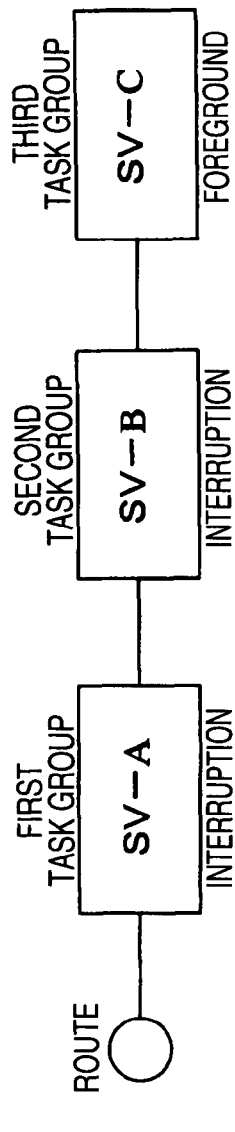
FIGS. 9A to 9C are exemplary fourth diagrams for explaining a case of activating a new service having the strong correlation.
Figure 9B:
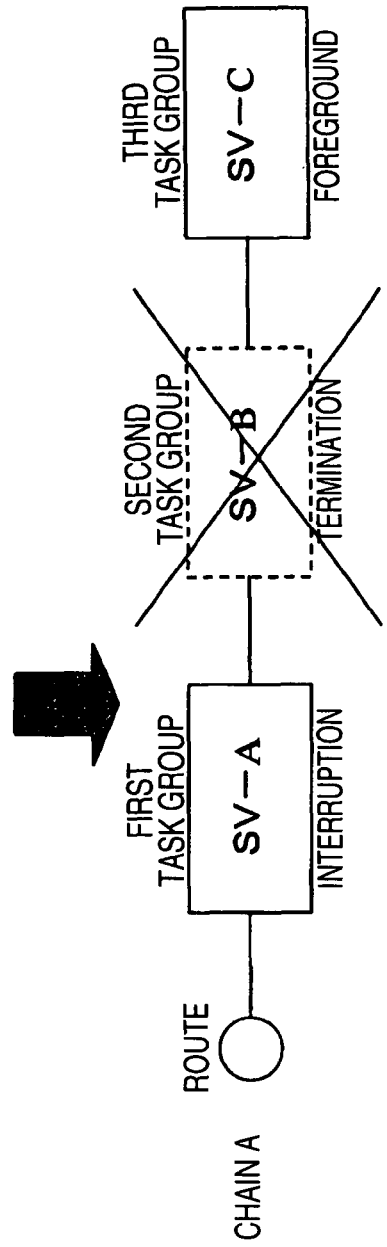
Figure 9C:
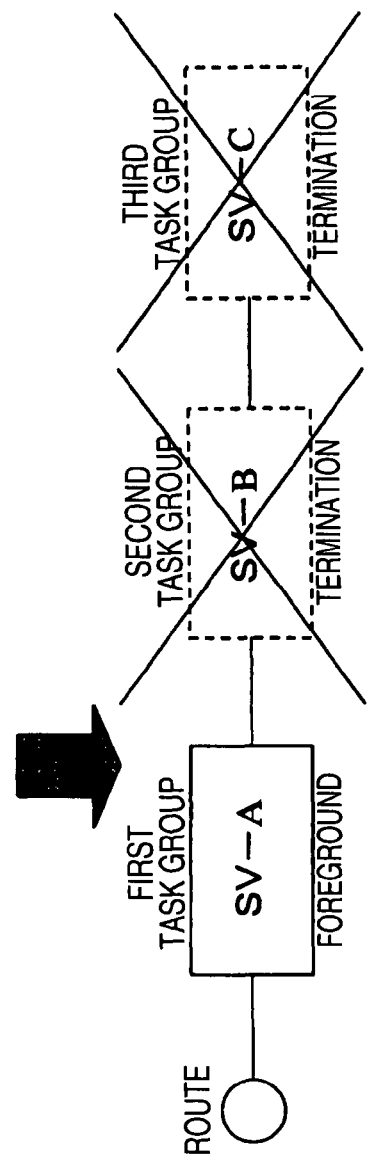

Next, a case of terminating operations of services which are not activated in the foreground state (first termination) will be described. FIG. 9A is a diagram showing a case where the service SV-C having the strong correlation is newly activated at the time when the service SV-B shown in FIG. 7A is activated in the foreground state and the service SV-A is suspended (where it is the same as the case shown in FIG. 8A). FIG. 9B is a diagram showing termination of the service SV-B suspended in the above-described state. FIG. 9C is a diagram showing a state a request for terminating the service SV-B shown in FIG. 9B has been already received. FIGS. 10A to 10C are diagrams showing that the task management and execution control unit 101a manages the states shown in FIGS. 9A to 9C, respectively. A specific example of terminating the service SV-B (the first termination) shown in FIG. 9B is as follows. In the course that an OBEC connection by a Bluetooth™ function is on standby (SV-A), when the voice calling (SV-B) is performed and the phone book is activated (SV-C) during the voice calling to be referred, the voice calling is terminated (termination of the service SV-B) by the opposite party of the voice calling.

In FIG. 9A, a case that a request for activating the service SV-C having the strong correlation is made in the course of activating the service SV-B in the foreground state is the same as the description in FIG. 8. In this event, as shown in FIG. 10A, the chain A is registered in the task management unit 151 (where it is the same as the state shown in FIGS. 6 and 7). Further, the service SV-C is newly registered in the task management unit 152 and the priorities of the services SV-B and SV-A drop down. Accordingly, the services SV-C, SV-B, and SV-A are registered in the order of the high priority.

Thereafter, when the service SV-B is terminated in the state shown in FIG. 9A, the task management and execution control unit 101a receives a request for terminating the service SV-B from the second task group 116c, and then terminates the service SV-B in FIG. 9B. The service SV-C having the strong correlation with the service SV-B is also terminated. In this event, the task management and execution control unit 101a has already registered the chain A in the chain management unit 151 as shown in FIG. 10B. The service SV-B is erased in the task management unit 152.

Further, as shown in FIG. 9C, the task management and execution control unit 101a requests the first task group 116b to execute the service SV-A having one step lower priority than the service SV-B in the foreground state. In this event, the task management and execution control unit 101a has already registered the chain A in the chain management unit 152 as shown in FIG. 10C. The service SV-C is erased in the task management unit 152, and therefore, the priority of the service SV-A goes up and the service SV-A only is registered.

Figure 11A:
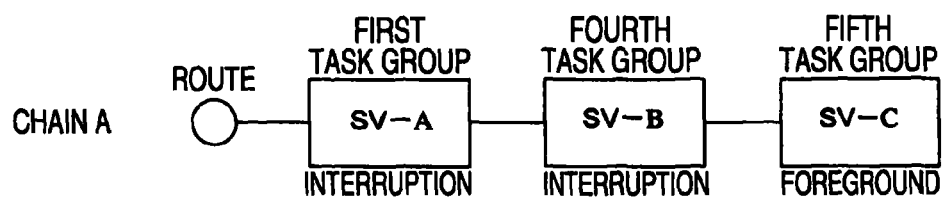
FIGS. 11A to 11D are exemplary sixth diagrams for explaining a case of activating a new service having the strong correlation.
Figure 11B:
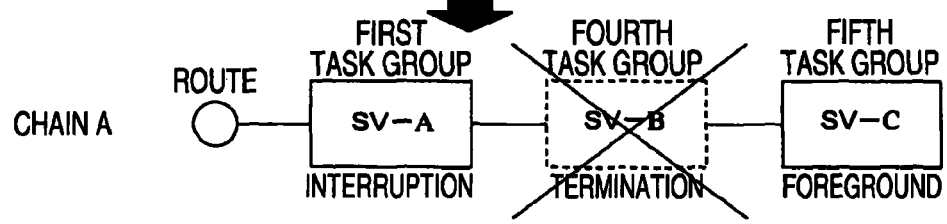
Figure 11C:
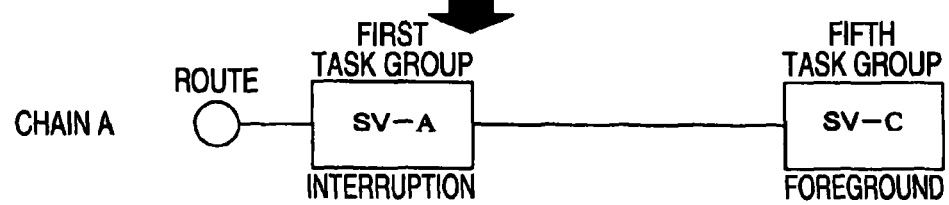
Figure 11D:
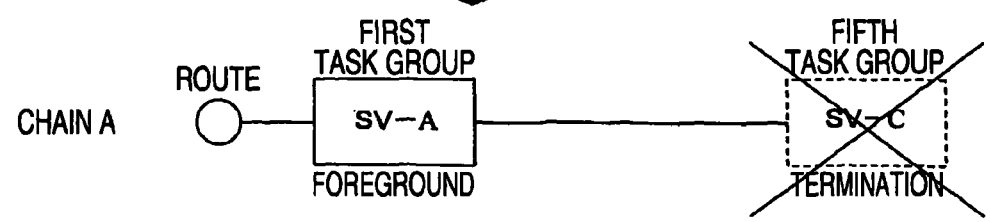

Next, a case of terminating operations of services which are not activated in the foreground state (second termination) will be described. FIG. 11A is a diagram showing a case where the service SV-C having the strong correlation is newly activated in a state that the service SV-B shown in FIG. 7A is activated in the foreground state and the service SV-A is suspended (where it is the same as the case shown in FIG. 8A). FIG. 11B is a diagram showing termination of the service SV-B suspended in the above-described state. FIG. 11C is a diagram showing a state a request for terminating the service SV-B shown in FIG. 11B has been already received. FIG. 11D is a diagram showing a state a request for terminating the service SV-A shown in FIG. 11C has been already received. FIGS. 12A to 12D are diagrams showing that the task management and execution control unit 101a manages the states shown in FIGS. 11A to 11D, respectively.

A specific example of terminating the service SV-B (the second termination) shown in FIG. 11B is as follows. After lists of a menu display (launcher display of function lists) are displayed (SV-A) and then the phone book is opened (SV-B), a display of mail writing (SV-C) is performed (termination of the phone book (SV-B)).

In FIG. 11A, a case that a request for activating the service SV-C having the strong correlation is made in the course of activating the service SV-B in the foreground state is the same as the description in FIG. 8. In this event, as shown in FIG. 12A, the chain A is registered in the task management unit 151 (where it is the same as the state shown in FIGS. 6 and 7). Further, the service SV-C is newly registered in the task management unit 152 and the priorities of the services SV-B and SV-A drop down. Accordingly, the services SV-C, SV-B, and SV-A are registered in the order of the high priority.

Thereafter, when the service SV-B is terminated in the state shown in FIG. 11A, the task management and execution control unit 101a receives a request for terminating the service SV-B from the second task group 116c, and then terminates the service SV-B in FIG. 11B. In this event, the service SV-C is not terminated in the foreground state and is continuously executed in the different way from the first termination shown in FIG. 9.

Further, the task management and execution control unit 101a has already registered the chain A in the chain management unit 151 as shown in FIG. 12B. The service SV-B is erased in the task management unit 152.

As shown in FIG. 11C, the priority of the service SV-A which has one step lower priority than the service SV-B goes up as much as one grade. In this event, the task management and execution control unit 101a has already registered the chain A in the chain management unit 151 as shown in FIG. 12C. The service SV-B is erased in the task management unit 152, and thus the priority of the service SV-A goes up. Accordingly, the services SV-C and SV-A are registered in the order of the high priority.

In addition, when the service SV-C is terminated in the state shown in FIG. 11C, the task management and execution control unit 101a requests to execute the service SV-A in the foreground state in FIG. 11D. In this event, the task management and execution control unit 101a has already registered the chain A in the chain management unit 151 as shown in FIG. 12D. The service SV-C is erased in the task management unit 152. Accordingly, the priority of the service SV-A does up and the service SV-A only is registered.

Next, a case a service having the weak correlation is newly activated in the state some service is activated in the foreground state will be described. FIGS. 13 to 18 are diagrams showing that services having the weak correlation are newly activated.

Figure 14A:
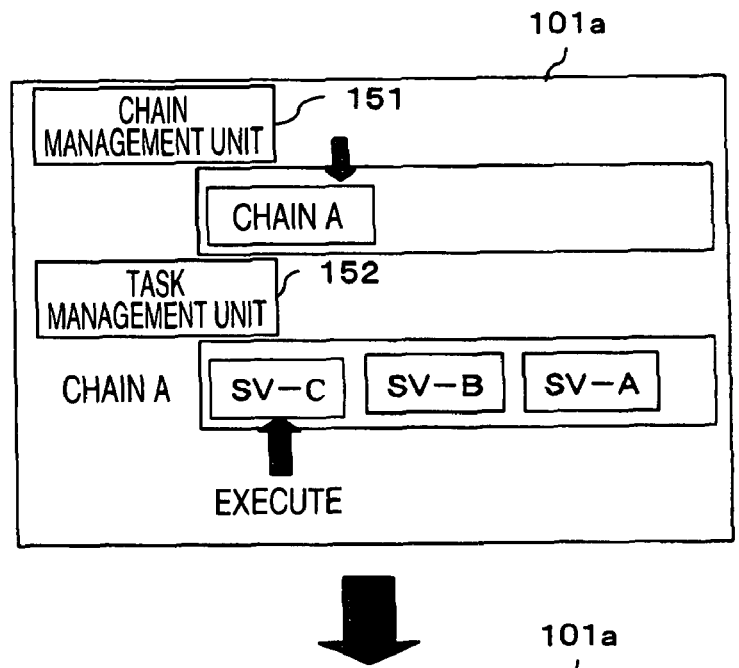
FIGS. 14A and 14B are exemplary second diagrams for explaining operations of a case of activating a new service having the weak correlation.
Figure 14B:
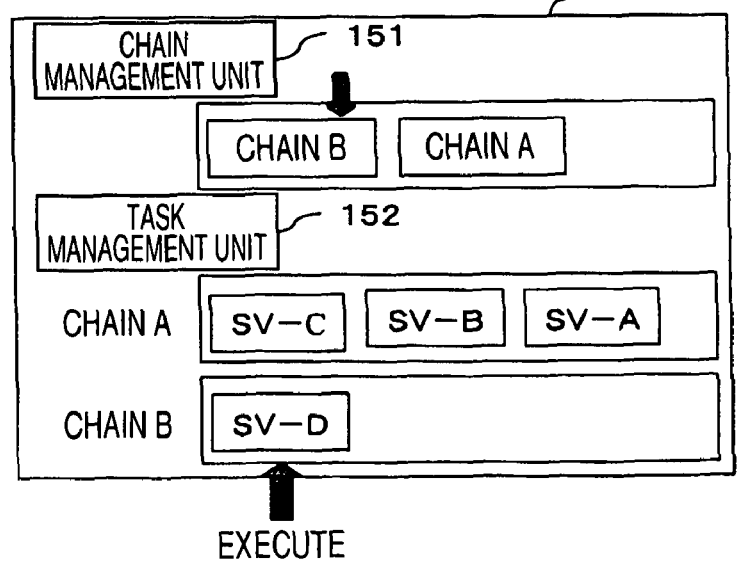

FIG. 13A is a diagram showing that the services SV-A, SV-B, and SV-C have a strong correlation with each other and that the service SV-C is activated in the foreground state and thus the services SV-A and SV-B are suspended. FIG. 13B is a diagram showing a case where the service SV-D having the weak correlation is newly activated in the above-described state. Further, FIGS. 14A and 14B are diagrams showing that the task management and execution control unit 101a manages the services in the states shown in FIGS. 13A and 13B, respectively. Specific examples are that after a main menu (SV-A) is activated and a music player (SV-C) is activated from a display of function lists (SV-B), a display of a mail writing (SV-D) is activated; that after the main menu (SV-A) is activated and a web browser (SV-C) is activated from the display of the function lists (SV-B), the display of the mail writing (SV-D) is activated; and the like.

In the state that the services SV-A, SV-B, and SV-C have the strong correlation with each other and that the service SV-C is activated in the foreground state and thus the services SV-A and SV-B are suspended as shown in FIG. 13A, the chain A is registered in the chain management unit 151 as shown in FIG. 14A. Further, the services SV-C, SV-B, and SV-A are registered in the order of the high priority in the task management unit 152.

Thereafter, when an operation for newly executing SV-D is performed by a user's pressing of the keys 6, for example, in the course of activating the service SV-C in the foreground state shown in FIG. 13A, the task management and execution control unit 101a receives a request for executing SV-D and executes the service SV-D by using management of a new chain B. Sequentially, the task management and execution control unit 101a instructs an execution of the service SV-D in the foreground state. The task management and execution control unit 101a instructs an execution of the service SV-C in the subsequent background state. In this event, as shown in FIG. 14B, the task management and execution control unit 101a drops down the priority of the chain A as much as one grade in the chain management unit 151 and registers the chain B as the highest priority plus the chain A. As for the task management of the chain A, the services SV-C, SV-B, and SV-A are registered in the order of the high priority in the task management unit 152. Further, the service SV-D is newly registered as the chain B plus the chain A.

Figure 15A:
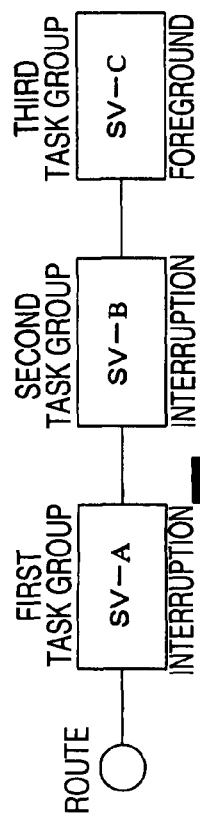
FIGS. 15A to 15C are exemplary third diagrams for explaining operations of a case of activating a new service having the weak correlation.
Figure 15B:
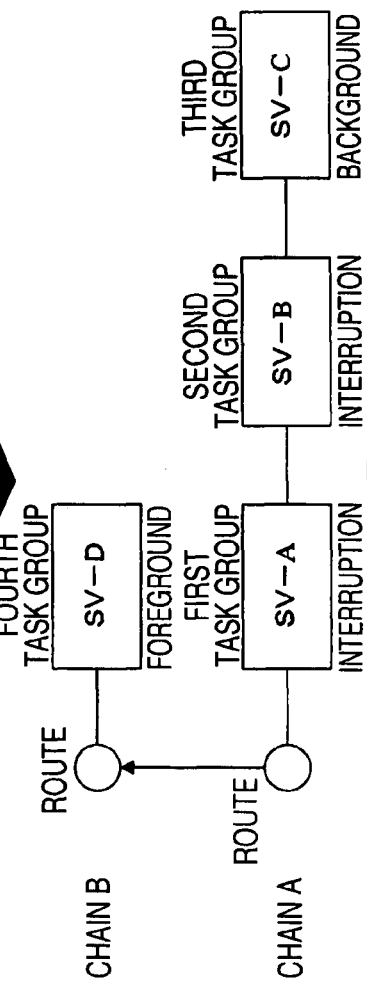
Figure 15C:
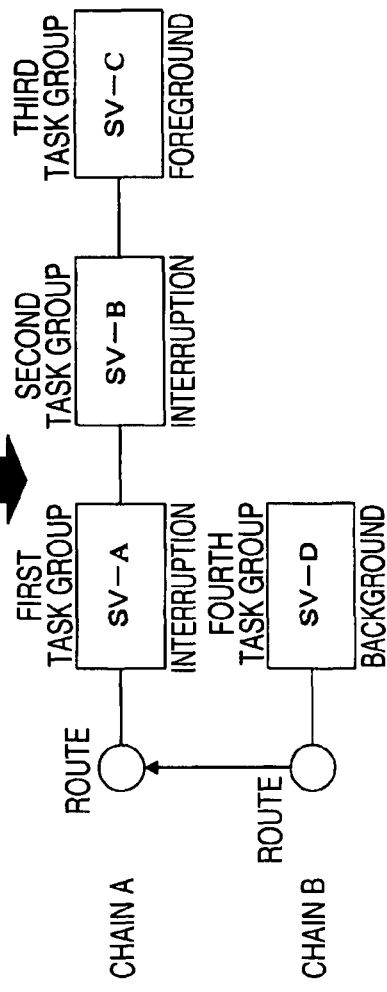
Figure 16A:
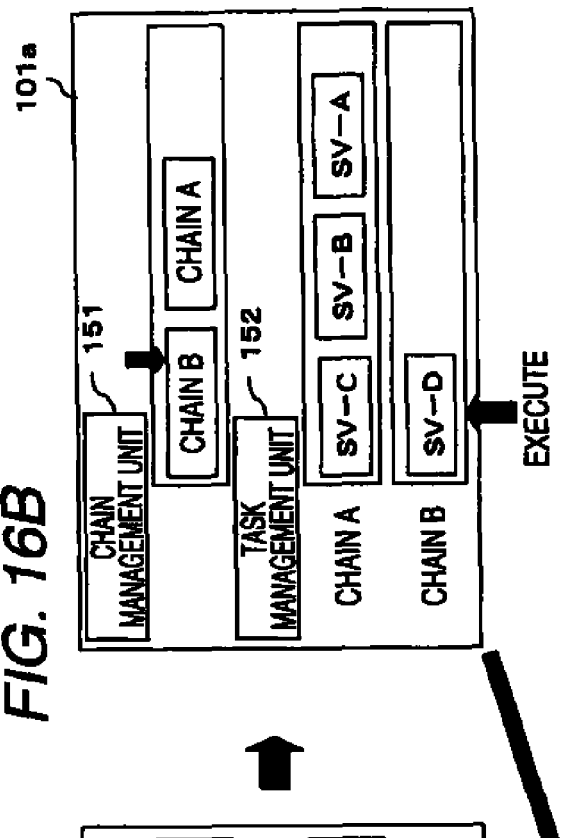
FIGS. 16A to 16C are exemplary fourth diagrams for explaining operations of a case of activating a new service having the weak correlation.
Figure 16B:
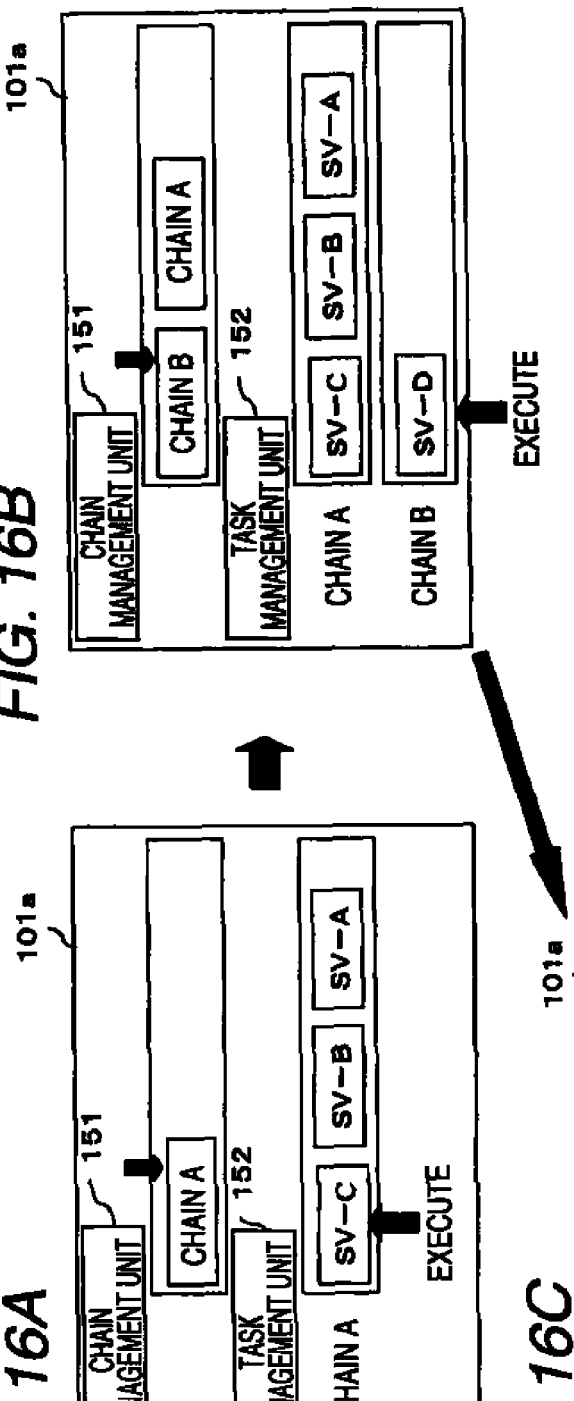
Figure 16C:
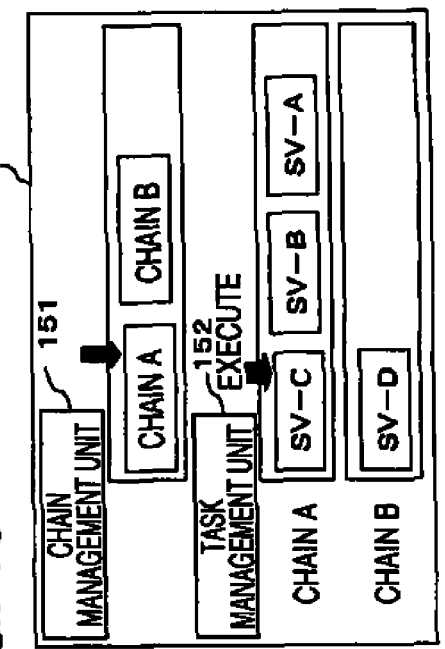

FIG. 15A is a diagram showing that the services SV-A, SV-B, and SV-C have the strong correlation with each other and that the service SV-C is activated in the foreground state and thus the services SV-A and SV-B are suspended. FIG. 15B is a diagram showing a case where service SV-D having the weak correlation is newly activated in the foreground state in the above-described state. FIG. 15C is a diagram showing a case where the service SV-C activated in the foreground state shown in FIG. 15B performs a request for the foreground state to the task management and execution control unit 101a, and then the task management and execution control unit 101a receives the request. Further, FIGS. 16A to 16C are diagrams showing that the task management and execution control unit 101a manages the services shown in FIGS. 15A to 15C, respectively. A specific example is that, after a main menu (SV-a) is activated, a count timer function (where a second number a user determines in advance is counted, SV-C) is activated from a display of function lists (SV-B), a shortcut function (SV-D) is activated during the count timer function, and then the second number counted by the count timer function becomes 0 to display an alarm display and to produce the alarm sound (request for the foreground).

In addition, descriptions shown in FIGS. 15A, 15B, 16A, and 16B are the same those shown in FIGS. 13A, 13B, 14A, and 14B, and thus are omitted.

When an event that the service SV-C has to be executed in the foreground state occurs in the course that the service SV-C is activated in the background state shown in FIG. 15B, the task management and execution control unit 101a receives the instruction in which the event that the service SV-C has to be executed in the foreground state occurs and determined whether or not the service SV-D executed in the present foreground state permits an interrupt event of the service SV-C. When the interrupt event is permitted, an instruction in which the service SV-D has to be executed in the background state is performed. Further, the task management and execution control unit 101a performs an instruction in which the service SV-C has to be executed in the foreground state. FIG. 15C is a diagram showing a case where the service SV-D permits the interrupt of the service SV-C.

On the other hand, the task management and execution control unit 101a determines whether the service SV-D executed in the present foreground state permits the interrupt event of the service SV-C. When the interrupt event is not permitted (in this case, the service SV-D is a calling task or the like, for example), an instruction in which the service SV-C is not permitted to be executed in the foreground state is performed.

The task management and execution control unit 101a in FIG. 15C, registers the chains A and B in the order of the high priority in the chain management unit 151 as shown in FIG. 16C (where the priorities of the chains A and B are changed). As for the task management of the chain A, the services SV-C, SV-B, and SV-A are registered in the order of the high priority in the task management unit 152. Further, as for the task management of the chain B, the service SV-D is registered. Since the execution of the chain A precedes, the service SV-C of the chain A is executed in the foreground state.

Figure 17A:
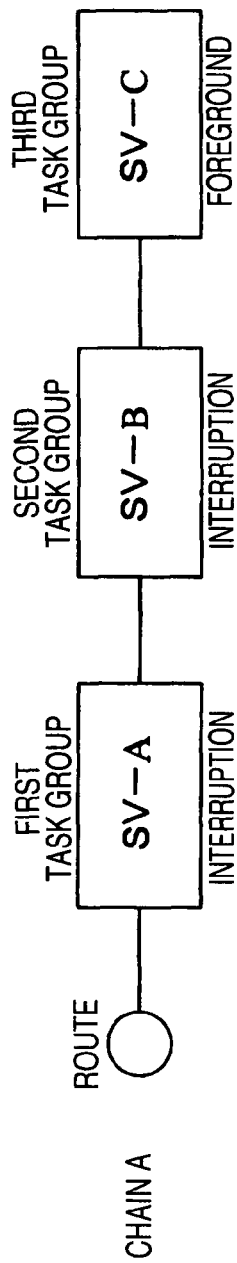
FIGS. 17A and 17B are exemplary fifth diagrams for explaining operations of a case of activating a new service having the weak correlation.
Figure 17B:
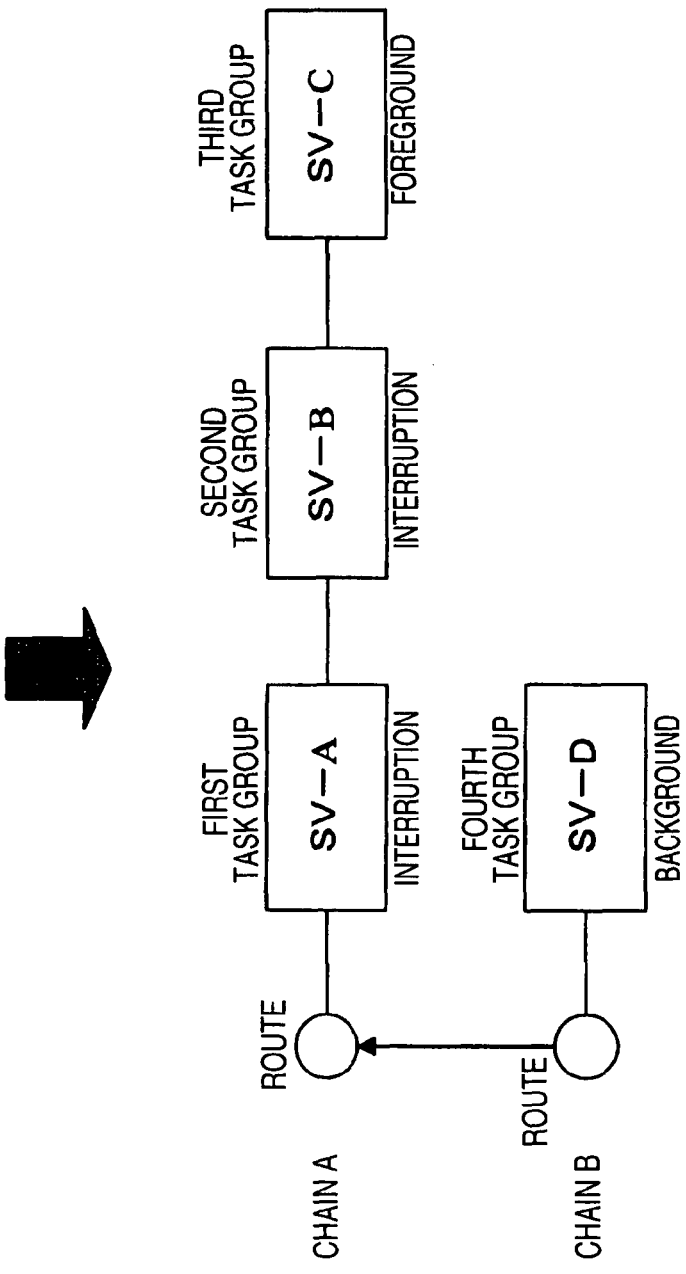
Figure 18A:
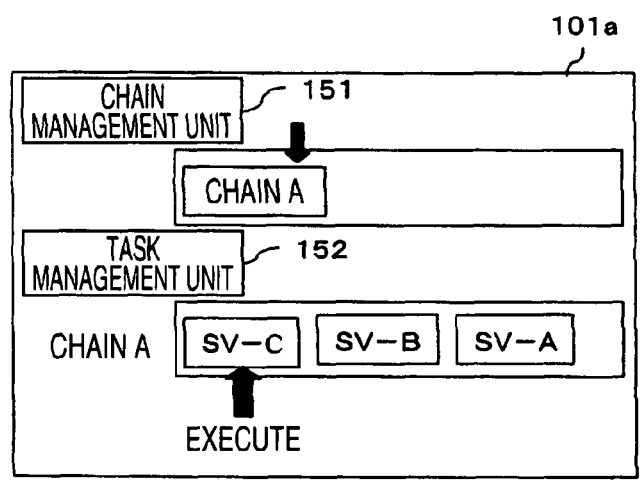
FIGS. 18A and 18B are exemplary sixth diagrams for explaining operations of a case of activating a new service having the weak correlation.
Figure 18B:
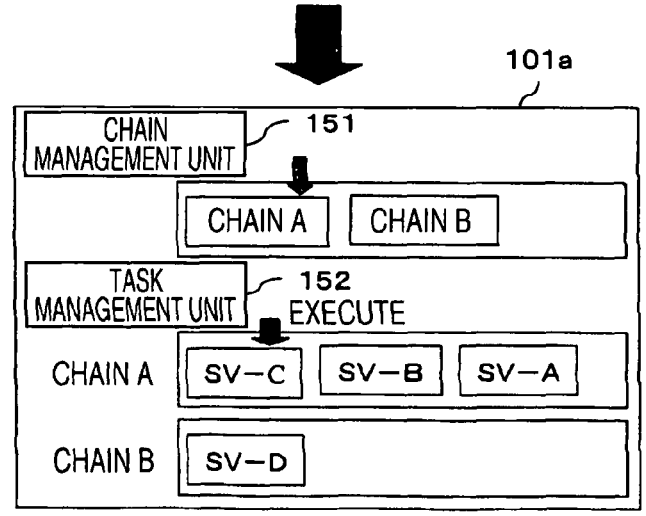

Next, FIG. 17A is a diagram showing that the services SV-A, SV-B, and SV-C have the strong correlation and that the service SV-C is activated in the foreground state and the services SV-A and SV-B are suspended. FIG. 17B is a diagram showing a case where the service SV-D having the weak correlation is newly activated in the background state in the above-described state. Further, FIGS. 18A and 18B are diagrams showing that the task management and execution control unit 101a manages the services shown in FIGS. 17A and 18B, respectively. A specific example is that after a main menu (SV-a) is activated, a game function (for example, executed by JAVA (registered trademark, hereinafter omitted) and the like, SV-C) is activated from a display of function lists (SV-B), and then a mail is received (SV-D) via the communication unit 118.

In addition, descriptions shown in FIGS. 17A and 18A are the same those shown in FIGS. 13A and 14A, and thus are omitted.

When there is an instruction from the communication unit 118 for newly executing the service SV-D (a case that the instruction for executing the service SV-D is received by trigger methods other than key operations of a user) in the course that the service SV-C is activated in the foreground state shown in FIG. 17A, for example, in order to notify a mail received from the exterior via the communication unit 118, the task management and execution control unit 101a receives a request for executing the service SV-D, and then executes the service SV-D by using management of a new chain B (activated in the state of the weak correlation). Further, the task management and execution control unit 101a determines whether the service SV-D is activated in the foreground state or in the background state, in accordance with services executed in the present foreground state. When the task management and execution control unit 101a determines to execute the service SV-D in the background state, it instructs to execute the service SV-D in the background state. In this event, SV-C is continuously executed in the foreground state.

As shown in FIG. 18B, the task management and execution control unit 101a registers the chain A as the present priority in the chain management unit 151 and registers the chain B as having one step lower priority than the chain A plus the chain A. Further, as for the task management of the chain A, the services SV-C, SV-B, and SV-A are registered in the task management unit 152 in the order of the high priority. As for the task management of the chain B plus the chain A, the service SV-D is newly registered.

Next, when a new service is activated in the course that a plurality of services are activated, a case that the new service has been already activated (multiple activation of the services) will be described. FIGS. 19 to 26 are diagrams showing operations for the multiple activations of the services.

Figure 19A:
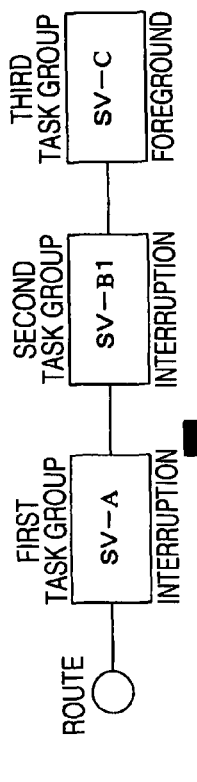
FIGS. 19A to 19D are exemplary first diagrams for explaining operations of multiple activation of a service.
Figure 19B:
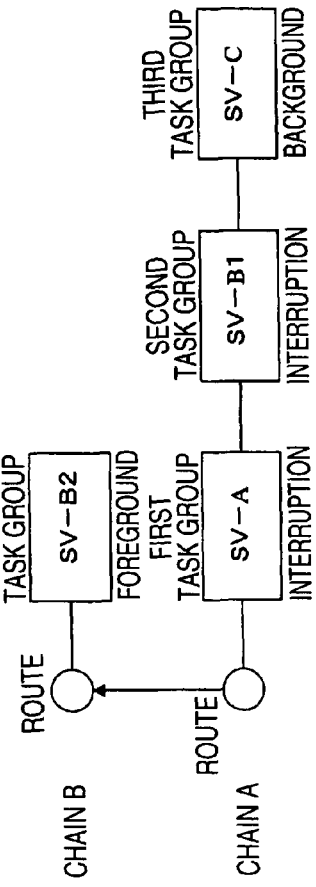
Figure 19C:
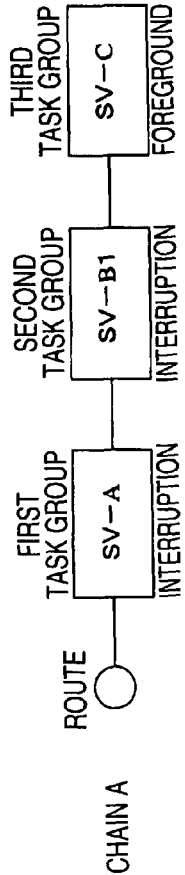
Figure 19D:
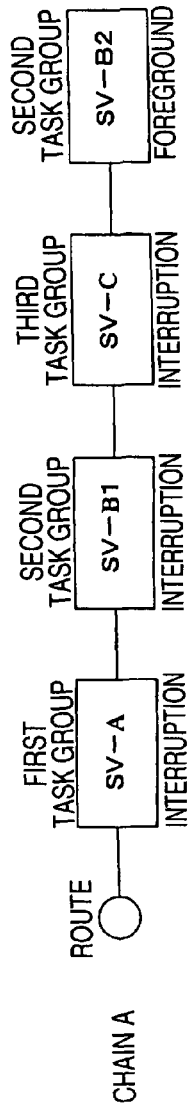

First, FIG. 19A is a diagram showing that the services SV-A, SV-B1, and SV-C have the strong correlation with each other and that the service SV-C is activated in the foreground state and the services SV-A and SV-B1 are suspended. FIG. 19B is a diagram showing a case where a service SV-B2 having the weak correlation with the service SV-C is newly activated in the above-describe state. FIGS. 20A and 20B are diagrams showing a case where the task management and execution control unit 101a manages the services shown FIGS. 19A and 19B, respectively. A specific example is that after a shortcut function (SV-A) is activated and a mail function (SV-B1) is activated to write the mail, the mail is received via the communication unit 118 in the course of referring a phone book function (SV-C) and the mail function (SV-B2) is activated again. Further, the services SV-B1 and SV-B2 are the same service and the multiple activations are permitted.

The services SV-A, SV-B1, and SV-C have the strong correlation with each other as shown in FIG. 19A and the chain A is registered in the chain management unit 151 as shown in FIG. 20A in the course that the service SV-C is activated in the foreground state and the services SV-A and SV-B1 are suspended. The services SV-C, SV-B1, and SV-A are registered in the order of the high priority in the task management unit 152.

Thereafter, when there is an instruction from the communication unit 118 for newly executing the service SV-B2 (a case that the instruction for executing the service SV-B2 is received by trigger methods other than key operations of a user) in the course that the service SV-C is activated in the foreground state shown in FIG. 19A, for example, in order to notify a mail received from the exterior via the communication unit 118, it is determined whether or not the service SV-B1 can be activated as the same duplicate service as shown in FIG. 19B. When the same service can be activated as the multiple activations, a request for activating the service SV-B2 so as to have the weak correlation and multiple activations is transmitted to the task management and execution control unit 101*a*, and the task management and execution control unit 101*a* executes the service SV-B2 by using management of a new chain B. Further, the service SV-B2 is executed in the foreground state. The task management and execution control unit 101*a* instructs to execute the service SV-C in the subsequent background state. In this event, the task management and execution control unit 101*a* drops down the priority of the chain A as much as one grade in the chain management unit 151 as shown in FIG. 20B and registers the chain B as the highest priority plus the chain A. Further, as for the task management of the chain A, the services SV-C, SV-B1, and SV-A are registered in the order of the high priority in the task management unit 152. As for the task management of the chain B plus the chain A, the service SV-B2 is newly registered.

In addition, FIGS. 19C, 19D, 20C, and 20D are diagrams showing the case that the service SV-B2 having the strong correlation is newly activated as the multiple activations, but the case that the service SV-B2 having the weak correlation is also almost equal. When an instruction for activating the service SV-B2 having the strong correlation is performed by a user, it is determined whether or not the service SV-B1 can be activated as the same duplicate service. When the same service can be activated as the multiple activations, a request for activating the service SV-B2 so as to have the strong correlation and multiple activations is transmitted to the task management and execution control unit 101*a*, and a new service SV-B2 is executed in the foreground state.

In addition, task management and execution control unit 101*a* requests to suspend the service SV-C, and then task execution of the service SV-C is suspended. In this event, the task management and execution control unit 101*a* registers the chain A in the chain management unit 151 as shown in FIG. 20D. Further, since the service SV-B2 is newly activated in the task management unit 152, as for the task management of the chain A, the services SV-B2, SV-C, SV-B1, and SV-A are registered together in the order of the high priority.

In addition, when the multiple activations are possible, the services are the same, but it is desirable that the services are operated as if the services are different. The initially activated service (SV-B1 in the above-described example) memorizes the state just before the suspend, and when the service is activated again in the foreground state, it is desirable that the service is operated in the same state as that for immediately before the suspend regardless of whether or not the service is activated as the multiple activations.

Figure 22A:
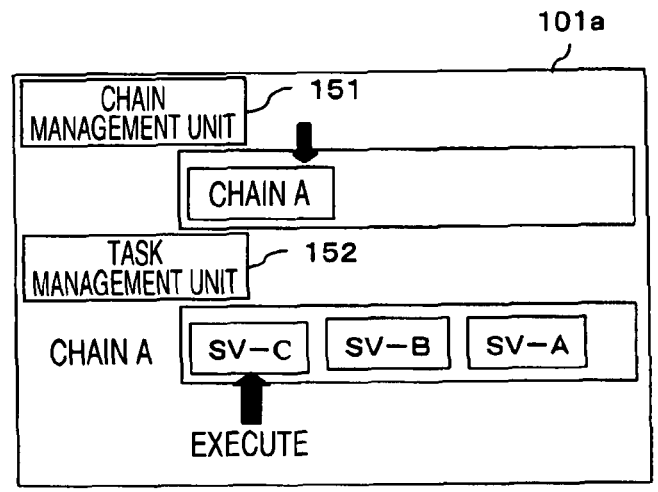
FIGS. 22A and 22B are exemplary fourth diagrams for explaining operations of multiple activation of the service.
Figure 22B:
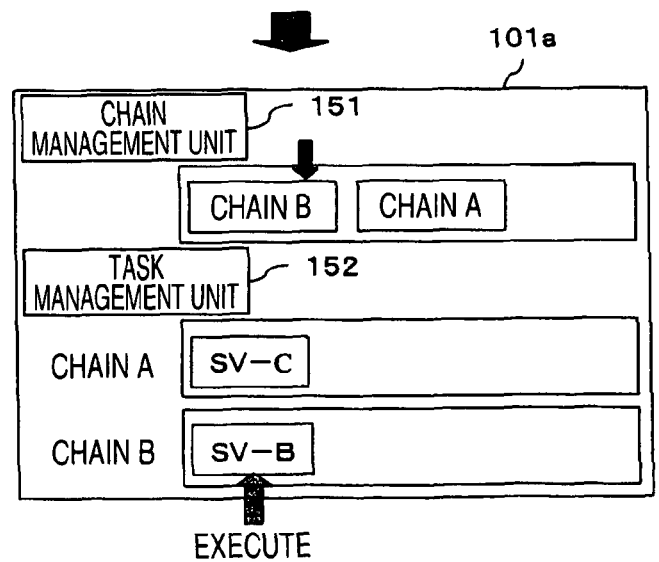
Figure 23A:
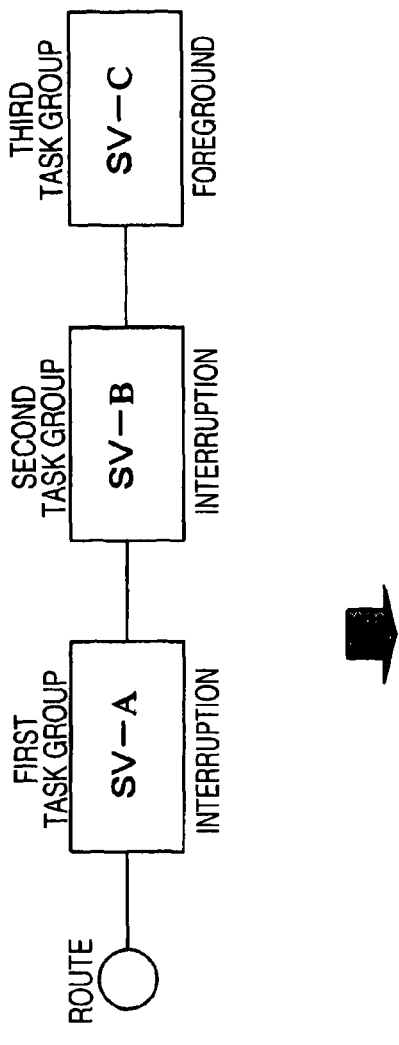
FIGS. 23A and 23B are exemplary fifth diagrams for explaining operations of multiple activation of the service.
Figure 23B:
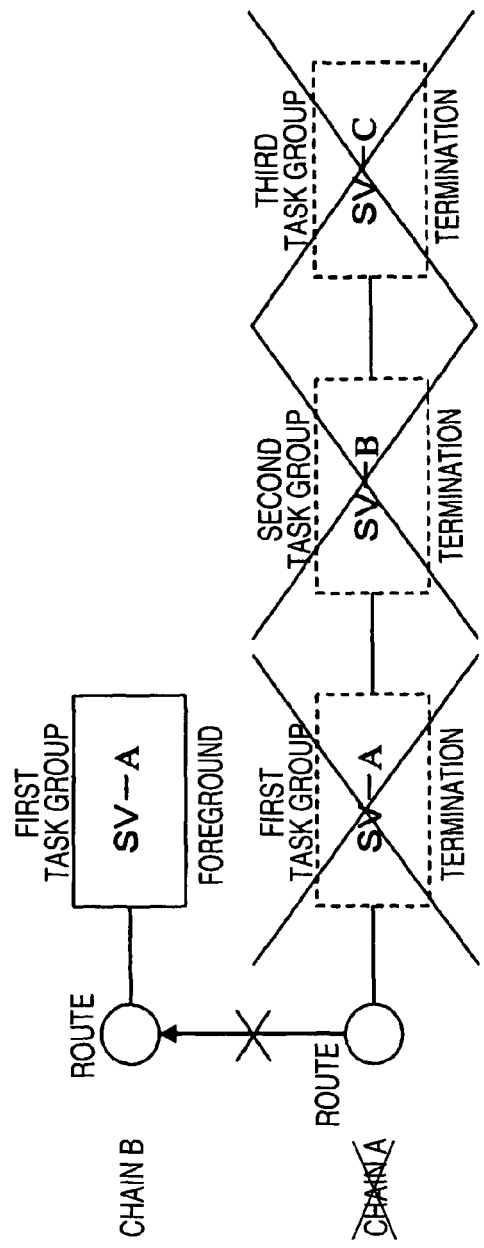
Figure 24A:
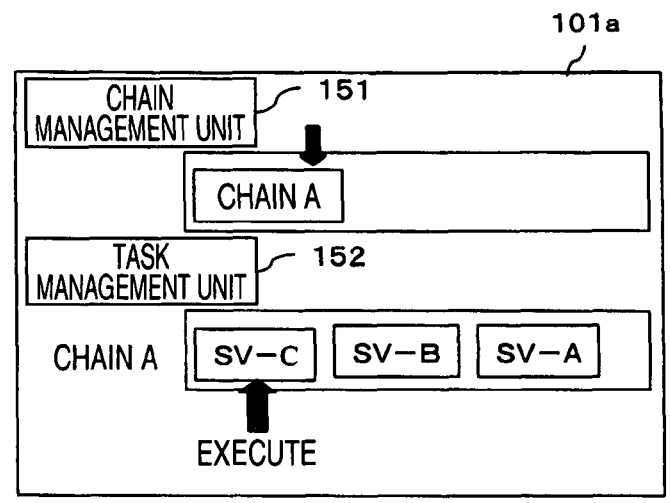
FIGS. 24A and 24B are exemplary sixth diagrams for explaining operations of multiple activation of the service.
Figure 24B:
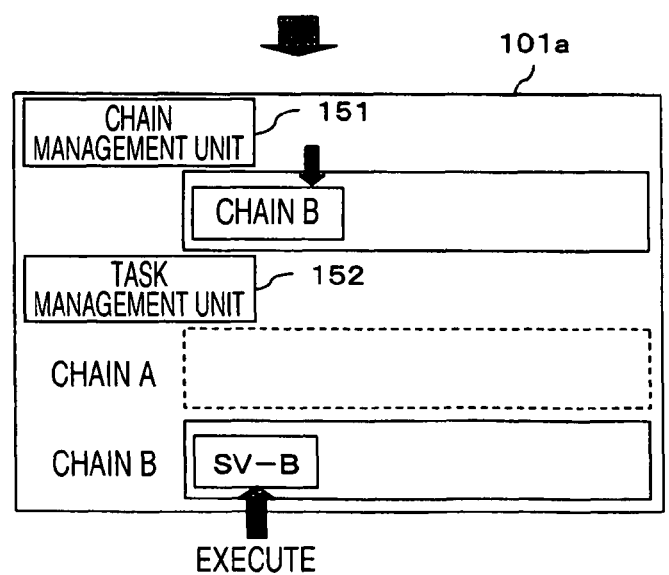

Next, FIG. 21A is a diagram showing that the services SV-A, SV-B1, and SV-C have the strong correlation with each other and that the service SV-C is activated in the foreground state and the services SV-A and SV-B1 are suspended (where it is the same as the description in FIG. 19A). FIG. 21B is a diagram showing a case where a service SV-B having the weak correlation with the service SV-C is newly activated in the above-describe state (a case that the service SV-B does not permit the multiple activations). FIGS. 22A and 22B are diagrams showing a case where the task management and execution control unit 101*a* manages the services shown FIGS. 21A and 21B, respectively. A specific example is that after a shortcut function (SV-A) is activated and a JAVA function (SV-B) is activated to perform a game, another JAVA function (for example, a navigation function) (SV-B) is activated again in the course of surfing web sites (SV-C).

The services SV-A, SV-B, and SV-C have the strong correlation with each other as shown in FIG. 21A and the chain A is registered in the chain management unit 151 as shown in FIG. 21A in the course that the service SV-C is activated in the foreground state and the services SV-A and SV-B are suspended. The services SV-C, SV-B, and SV-A are registered in the order of the high priority in the task management unit 152.

Thereafter, when the service SV-B is newly activated, for example, by a user's pressing of the keys 6 in the course that the service SV-C is activated in the foreground state shown in FIG. 21A, it is determined whether or not the service SV-B can be activated as duplicate service as shown in FIG. 21B. When the same service cannot be activated as the multiple activations, a request for activating the service SV-B so as to have the weak correlation is transmitted to the task management and execution control unit 101*a*, and the task management and execution control unit 101*a* executes the service SV-B by using management of a new chain B. Further, the newly activated service SV-B is executed in the foreground state. The task management and execution control unit 101*a* instructs that the service SV-B is activated so as to have the strong correlation with the service SV-B (in the middle of being suspended) which has been already activated and instructs the service SV-C having the higher priority to terminate the service. In this event, the task management and execution control unit 101*a* drops down the priority of the chain A as much as one grade in the chain management unit 151 as shown in FIG. 22B and registers the chain B as the highest priority plus the chain A. Further, as for the task management of the chain A, the services SV-C and SV-B are terminated and erased in the task management unit 152, and thus the service SV-A only are registered. As for the task management of the chain B plus the chain A, the service SV-B is newly registered.

When the multiple activated services are basic services (a case that the service SV-A cannot be activated as multiple services when the service SV-A is newly activated), strong correlation services which have higher priority over the services (SV-A in FIG. 23A) which have been already activated are all terminated in FIGS. 23A, 23B, 24A, and 24B. Accordingly, all services of the chain A are terminated. Therefore, the task management and execution control unit 101*a* erases the chain A in the task management unit 152.

In addition, the services management shown in FIGS. 21A and 21B can be controlled as follows.

Figure 26A:
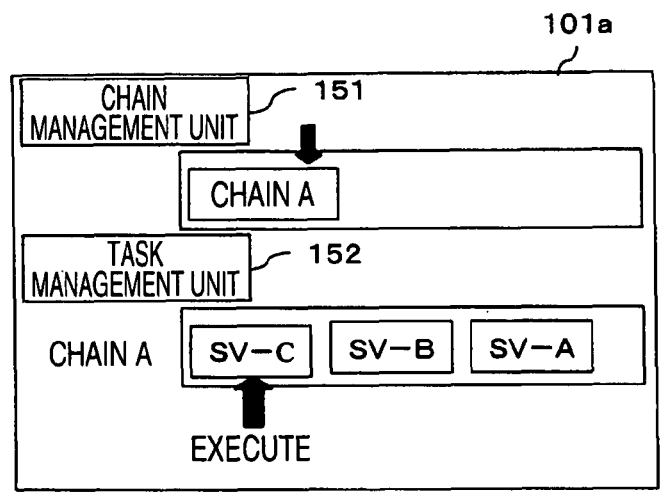
FIGS. 26A and 26B are exemplary eighth diagrams for explaining operations of multiple activation of the service.
Figure 26B:
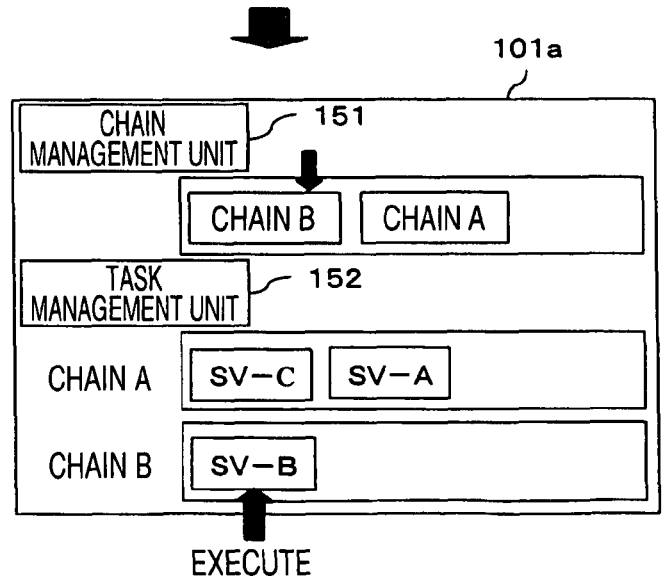

FIG. 25A is a diagram showing that the services SV-A, SV-B, and SV-C have the strong correlation with each other and that the service SV-C is activated in the foreground state and the services SV-A and SV-B are suspended (where it is the same as the description in FIG. 21A). FIG. 25B is a diagram showing a case where a service SV-B having the weak correlation with the service SV-C is newly activated in the above-describe state (a case that the service SV-B does not permit the multiple activations, other management methods). FIGS. 26A and 26B are diagrams showing a case where the task management and execution control unit 101*a* manages the services shown FIGS. 25A and 25B, respectively When the service SV-B is newly activated, for example, by a user's pressing of the keys 6 in the course that SV-C is activated in the foreground state shown in FIG. 25A, it is determined whether or not the service SV-B can be activated as an duplicate service as shown in FIG. 25B. When the same service cannot be activated as the multiple activations, a request for activating the service SV-B so as to have the weak correlation is transmitted to the task management and execution control unit 101*a*, and the task management and execution control unit 101*a* executes the service SV-B by using management of a new chain B. Further, the newly activated service SV-B is executed in the foreground state (where so far, it is the same as the description in FIG. 21B). The task management and execution control unit 101*a* instructs to terminate the already-activated service SV-B (in the middle of being suspended) and to correlate with services SV-A and SV-C. In this event, the task management and execution control unit 101a drops down the priority of the chain A as much as one grade in the chain management unit 152 as shown in FIG. 26B and registers the chain B as the highest priority plus the chain A. Further, as for the task management of the chain A, the service SV-B is terminated and erased, and thus the services SV-C and SV-A are registered in the order of the high priority. As for the task management of the chain B plus the chain A, the service SV-B is newly registered.

Figure 27A:
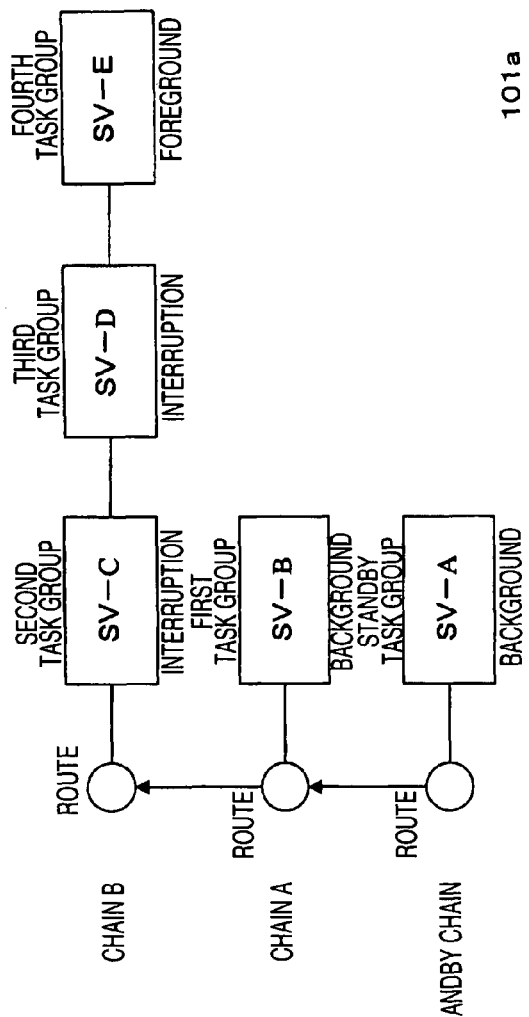
FIGS. 27A and 27B are exemplary first diagrams for explaining a case that an interrupt operation happens in the course of activating a plurality of services in correlation.
Figure 27B:
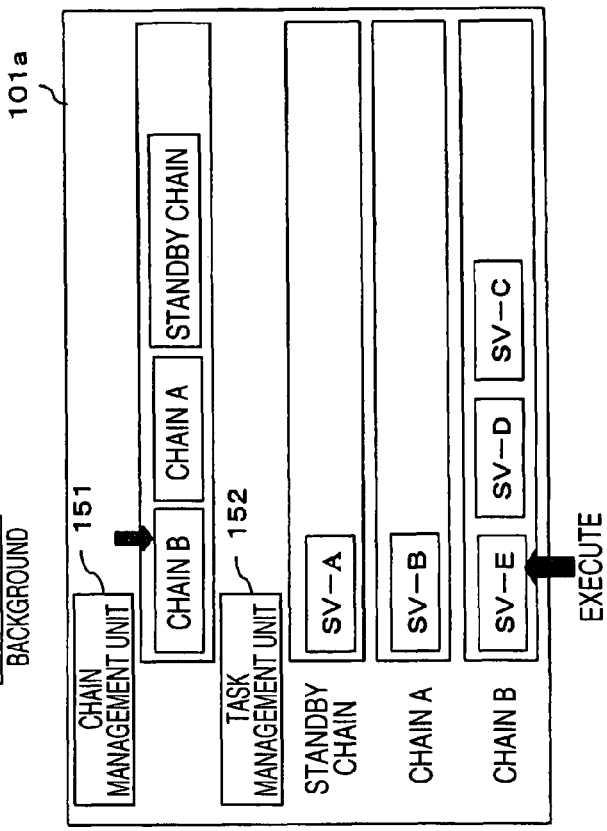
Figure 28:
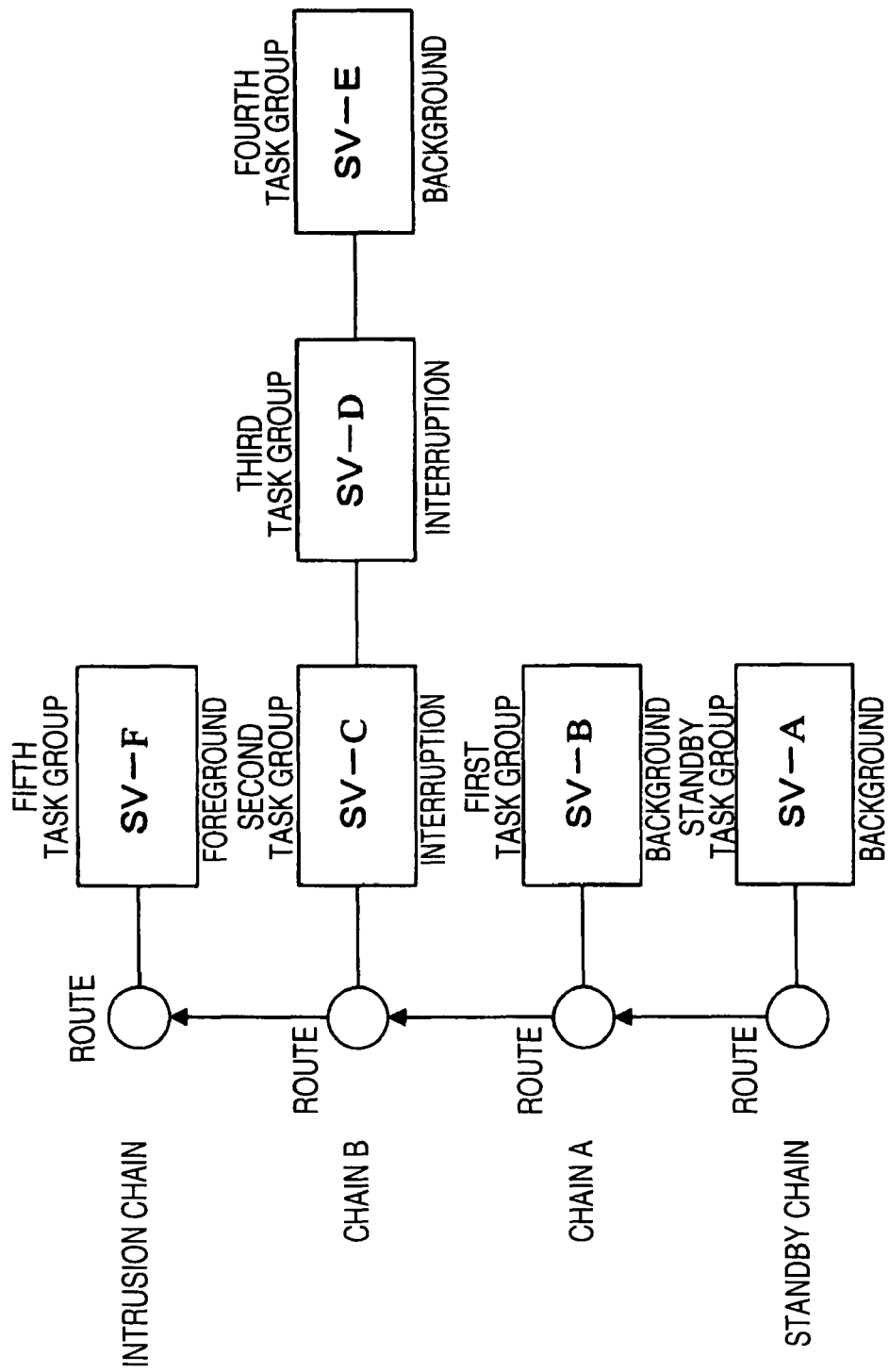
FIG. 28 is an exemplary second diagram for explaining a case that an interrupt operation happens in the course of activating a plurality of services in correlation.
Figure 29:
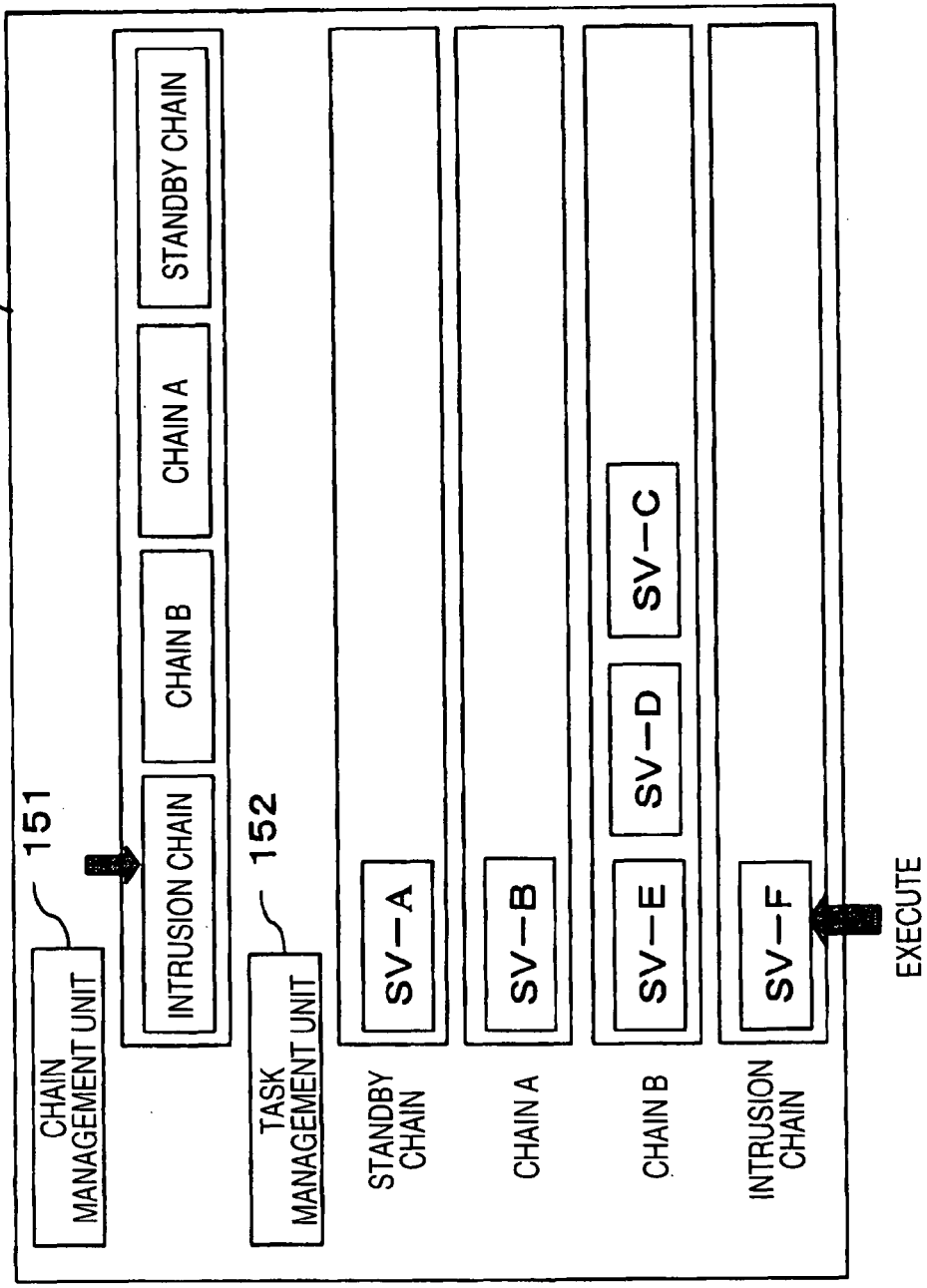
FIG. 29 is an exemplary third diagram for explaining a case that an interrupt operation happens in the course of activating a plurality of services in correlation.
Figure 30:
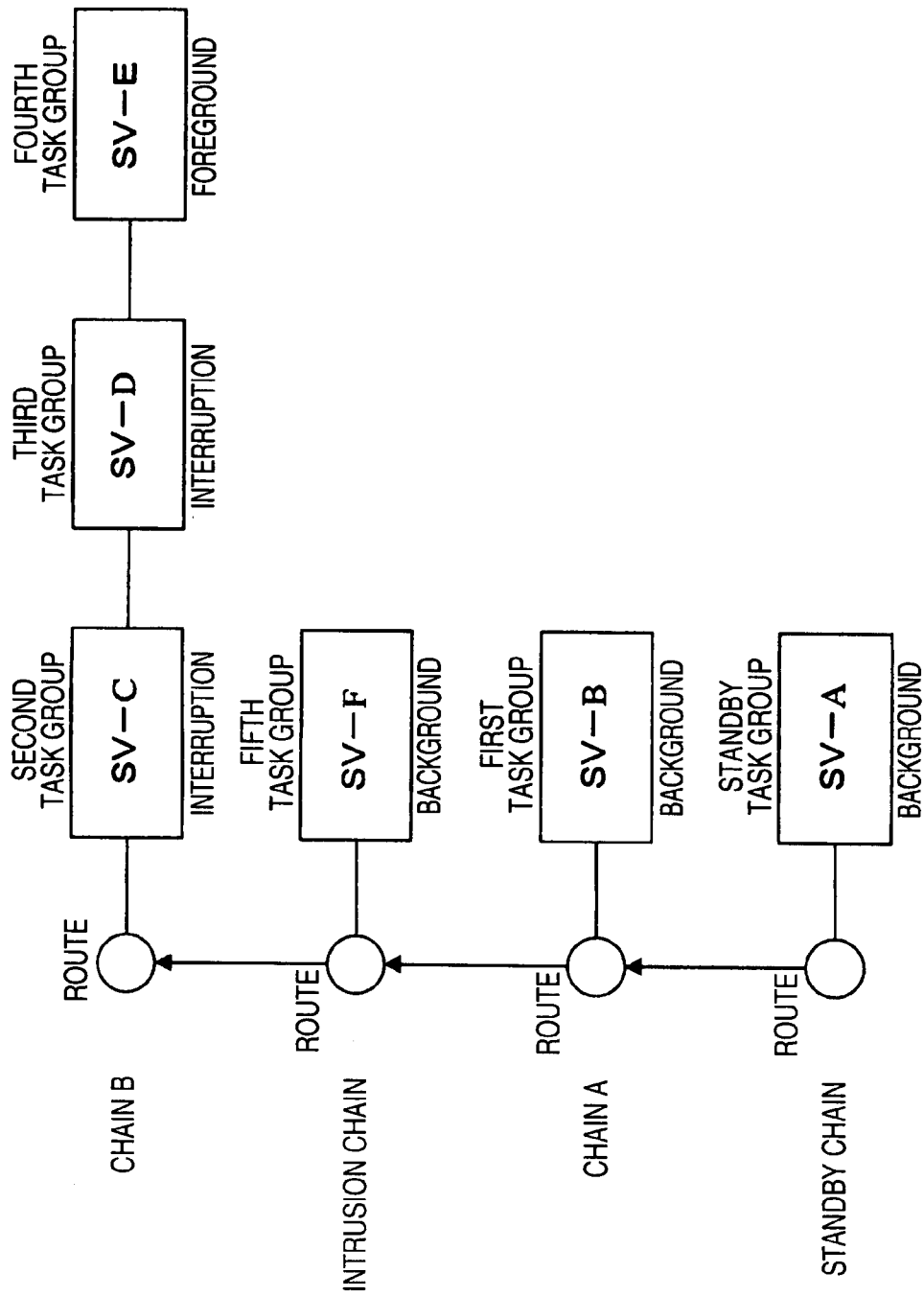
FIG. 30 is an exemplary fourth diagram for explaining a case that an interrupt operation happens in the course of activating a plurality of services in correlation.

Next, with reference to FIGS. 27 to 30, a case that an interrupt operation happens in the course of activating a plurality of services will be described. FIGS. 27A and 27B are diagrams showing a case before the interrupt operation happens and FIGS. 28 to 30 are diagrams showing a case after the interrupt operation happens.

FIG. 27A is a diagram showing a case where the standby task group 116a (SV-A) is activated, the services SV-B and SV-C are activated so as to have the weak correlation, the services SV-D and SV-E are activated so as to have the strong correlation, and the service SV-E is activated in the foreground state. FIG. 28 is a diagram showing case that the service SV-F is newly activated as an interrupt task in the above-described state. FIGS. 27B and 29 are diagrams showing a case where the task management and execution control unit 101a manages the services shown FIGS. 27A and 28, respectively A specific example is that after a standby display (SV-A) is activated and a web browser function (SV-B) is activated, a mail writing function (SV-C) is activated, a display-showing function of attached file lists is selected, a camera function (SV-E) is activated, and then a call reception (SV-F) is interrupted during the camera operation.

As shown in FIG. 27A, services SV-A, SV-B, and SV-C have the weak correlation with each other, and services SV-C, SV-D, and SV-E have the strong correlation with each other. In the course of activating the service SV-E in the foreground state and activating the service SV-B and SV-A in the background state, the chain B, the chain A, and the standby chain are registered in the order of the high priority in the chain management unit 151 as shown in FIG. 27B. Further, the service SV-A is registered as the standby chain, the service SV-B is registered as the chain A, the services SV-E, SV-D, and SV-C are registered as the chain B in the order of the high priority in the task management unit 152.

Thereafter, when the communication unit 118 receives a signal of a voice calling reception in the course that the service SV-E is activated in the foreground state shown in FIG. 27A, the control unit 101 instructs a call task (referred to as a K task group) (not shown) to be activated and requests the task management and execution control unit 101a to execute call task by the interrupt. Further, the task management and execution control unit 101a performs management of the task (where SV-F is activated) so as to allow the call task having the weak correlation to be activated as the present executed service and instructs the service SV-E which has been activated in the foreground state so far to be activated in the background. FIG. 28 is a diagram showing the above-described state.

In this event, the task management and execution control unit 101a drops down each priority of the chain B, the chain A, and the standby chain as much as one grade in the chain management unit 151 as shown in FIG. 29, and then registers the interrupt chain as the highest priority. The task management of the standby chain and the chain A is not changed and the service SV-F is registered as a new interrupt chain in the task management unit 152.

As described above, specific examples of the interrupt include (A) an activation of a call task by receiving the signal of the voice call reception, (B) an activation of an alarm task by arrival of an alarm time in alarm function, (C) an activation of a mail task (reception of a mail header) by receiving a signal of a mail reception, and (D) an activation of a task of a power OFF function at a time predetermined by a user (where it is described as an automatic power OFF function below). However, the above-described interrupts have a possibility problems happen when the interrupting chains are activated as the highest priority uniformly at the time of the interrupt. It is desirable that whether the suspending chain is activated as the highest priority or as other priorities is determined in accordance with circumstances. Hereinafter, several patterns of the suspend priorities from (A) to (D) will be described.

(A) Case of Interrupt by Call Task

When a signal of a voice call is received, a call task is controlled as an interrupt of the highest priority in FIGS. 27 to 29.

(B) Case of Interrupt by Alarm Task

When an alarm task is interrupting by means of arrival of an alarm time in an alarm function, it is desirable that the interrupt is performed by the following method. The interrupt of the alarm task will be described with reference to FIG. 27A. First, when the alarm task determines that an alarm time arrives, the alarm task requests activation to the task management and execution control unit 101a. The task management and execution control unit 101a instructs each service (SV-C, SV-D, and SV-E) of the highest priority chain (chain B in FIG. 27A) among the services (SV-A to SV-E in FIG. 27A) which are activated at the present time to determine whether or not the interrupt of the alarm task (L task group) is set to be permitted. Each service of the highest priority chain determines whether or not the permission of the interrupt of the alarm task is set, and then returns the result to the task management and execution control unit 101a. In addition, it is desirable that each task group (the standby task 116a, the first task group 116b, . . . , the N task group 16n) of the cellular phone 1 registers task groups which permit the interrupt and task groups which do not permit the interrupt in advance when the own task group is activated, but is not limited. For example, when the services are activated or when operations of the services are changed, services which permit the interrupt or do not permit the interrupt can be registered together with the registration of the services to the task management and execution control unit 101a on occasion. In this manner, the task management and execution control unit 101a itself can determine to permit the interrupt or not, without referring to the services on purpose to determine whether or not the corresponding interrupt is permitted In addition, when there is a service which inhibits the interrupt of the alarm task in the highest priority chain, the task management and execution control unit 101a inhibits the alarm task (L task group) from executing the alarm. Sequentially, the alarm task receives the inhibiting signal and retains the alarm operation until some time passes (After some time passes, the alarm task is activated again.).

On the other hand, when there is no service which inhibits the interrupt of the alarm task in the highest priority chain (a case of permitting the interrupt), the task management and execution control unit 101a instructs to allow the instruction of the alarm task and to register the interrupt chain and instructs the service before the interrupt (SV-E in FIG. 28) to be operated in the background state as shown in FIG. 28.

(C) Case of Interrupt by Mail Task

Next, when a signal of the mail reception is received and a mail task is activated to allow the interrupt, it is desirable that the interrupt is performed by the following method. The interrupt of the mail task will be described with reference to FIG. 27A. First, when the mail task receives the signal of the mail reception via the communication unit 118 and the mail task (M task group) receives an order of activating the task, the mail task requests activation to the task management and execution control unit 101*a*. The task management and execution control unit 101*a* instructs the service (the highest priority service, SV-E in FIG. 27A) which is activated at the present time to determine whether or not the interrupt of the mail service (M task group) is set to be permitted. Each service of the highest priority chain determines whether or not the permission of the interrupt of the mail task is set, and then returns the result to the task management and execution control unit 101*a*.

In addition, when the service which is activated in the foreground state at the present time inhibits the interrupt of the mail task, the task management and execution control unit 101*a* instructs the mail task (M task group) to activate the service in the background state. For example, the mail task is activated as a next high priority chain of the present highest priority chain as shown in FIG. 30. Sequentially, the mail task receives an order of activation in the background state and then the service is activated. In addition, when the service is generally activated in the background state, the service foreground state is indicated on the display 5, but when the interrupt of the mail task is performed in the background state, the mail reception PICT 57 can be indicated on the display 5 or some portion of the sub-display unit 13 shown in FIG. 3A, for example. Further, when the mail task performs the interrupt in the background state, a vibrator (not shown) can be allowed to be vibrated or a mail reception sound can be allowed to be produced from the speaker 109.

On the other hand, when the service which is activated in the foreground state at the present time permits the interrupt of the mail task, the task management and execution control unit 101*a* instructs to permit the interrupt of the mail task, registers the interrupt chain, and instructs the service (SV-E) in the foreground state before the interrupt to be operated in the background state.

(D) Case of Interrupt by Task of Automatic Power OFF Function

When the task of the automatic power OFF function is allowed to perform the interrupt, it is desirable that the interrupt is performed by the following method. A case that the task of the automatic power OFF function performs the interrupt will be described with reference to FIG. 27A. First, when the task (K task group) of the automatic power OFF function determines that the automatic power OFF time comes, the task requests activation to the task management and execution control unit 101*a*. The task management and execution control unit 101*a* instructs all services (SV-A to SV-E in FIG. 27A) which are activated at the present time to determine whether or not the interrupt of the task (K task group) of the automatic power OFF function is set to be permitted. The instructed services determine whether or not the permission of the interrupt of the task of the automatic power OFF function is set, and then return the result to the task management and execution control unit 101*a*.

In addition, when there is a service which inhibits the interrupt of the task of the automatic power OFF function among all services, the task management and execution control unit 101*a* inhibits the task (K task group) of the automatic power OFF function from executing the automatic power OFF function. Sequentially, the task of the automatic power OFF function receives the inhibiting signal and retains the automatic power OFF function until some time passes (After some time passes, the task is activated again.). When the execution of the automatic power OFF function is inhibited once, the task management and execution control unit 101*a* notifies the intent (transmitting the change notification) at every time the situation of the task management is changed. Sequentially, the task of the automatic power OFF function receives the change notification and then can request activation.

On the other hand, when there is no service which inhibits the interrupt of the task of the automatic power OFF function among all services (a case of permitting the interrupt), the task management and execution control unit 101*a* instructs the task of the automatic power OFF function to perform the instruction.

The determination methods of the interrupt by means of the four specific examples of the (A) to (D) are described, but specifically limited. For example, it is regardless to say that the interrupt of the alarm task can be performed by any one of the (A), (C), and (D).

In this manner, when the task groups are managed similarly to the embodiment, it is possible to manage the task in consideration of the relationship between the task groups. Accordingly, the task can be more properly managed.

According to the above-describe embodiment, since the tasks can be managed in consideration of a relation between task groups in the course of managing the task groups, it is possible to provide a mobile terminal capable of more properly managing tasks.

In addition, the invention is not limited to the above-described embodiment. For example, the invention can be applied to other mobile terminals such as PDA and PHS as well as a cellular phone.

What is claimed is:

1. A mobile terminal comprising:
a task executing unit in a computing device capable of executing a series of executable instructions stored in a memory of the computing device to execute a plurality of task groups; and
a management unit in the computing device capable of executing a series of executable instructions stored in the memory of the computing device to manage execution of the plurality of task groups executed by the task executing unit,
wherein, in response to receiving, during the execution of a first task group in foreground in a first chain, a request for executing a second task group different from the first task group, the management unit determines whether the second task group expects a return of information from the first task group, and
the management unit manages the first task group and the second task group in the first chain and causes the second task group to be executed in foreground if the management unit determines that the second task group expects the return of information from the first task group, and
the management unit manages the second task group in a second chain different from the first chain and causes the second task group to be executed if the management unit determines that the second task group does not expect the return of information from the first task group.

2. A mobile terminal according to claim 1, wherein,
the management unit suspends the execution of the first task group and causes the second task group to be executed in foreground in the first chain if the management unit determines that the second task group expects the return of information from the first task group.

3. A mobile terminal according to claim 1, wherein,
the management unit causes the first task group to be executed in background in the first chain and causes the second task group to be executed in foreground in the second chain if the management unit determines that the second task group does not expect the return of information from the first task group.

4. A mobile terminal according to claim 3, wherein,
the management unit causes the first second task group to be executed in background in the second chain and causes the first task group to be executed in foreground in the first chain in response to an occurrence of an event to be executed by the first task group during the execution the first task group in background.

5. A mobile terminal according to claim 2,
wherein, if the management unit terminates the execution of the second task group after the suspension of the execution of the first task group,
the management unit restarts to execute the first task group in foreground.

6. A mobile terminal according to claim 5, wherein the first task group functions for writing a mail, and
wherein the second task group functions for accessing a phone book.

7. A mobile terminal according to claim 2,
wherein, in response to receiving an additional request for executing a third task group during the execution of the second task group in foreground in the first chain,
the management unit manages the first task group, the second task group, and the third task group in the first chain, and
wherein if the management unit terminates the execution of the second task group after the management unit manages the first task group, the second task group, and the third task group in the first chain,
the management unit terminates the execution of the third task group and restarts to execute the first task group in foreground.

8. A mobile terminal according to claim 7, wherein the first task group functions a standby for a short-distance wireless communication,
wherein the second task group is a function for calling, and
wherein the third task group is a function for accessing a phone book.

9. A mobile terminal according to claim 1, wherein
the management unit manages the first chain and the second chain so that the second chain is less than the first chain in order of priority, and causes the first task group to be executed in foreground in the first chain and causes the second task group to be executed in background in the second chain if the management unit determines that the second task group does not expect the return of information from the first task group.

10. A mobile terminal according to claim 9, wherein the second task group is a function for receiving a mail.

11. A mobile terminal comprising:
a task executing unit in a computing device capable of executing a series of executable instructions stored in a memory of the computer device to execute a plurality of task groups; and
a management unit in the computing device capable of executing a series of executable instructions stored in a memory of the computer device execution of the task group executed by the task executing unit,
wherein in response to receiving, during the execution of a first task group in foreground in a first chain, request for executing a second task group different from the first task group, the management unit determines whether the second task group expects a return information from the first task group, and
the management unit is capable of managing with a strong correlation the first task group and the second task group in the first chain, and causes the second task group to be executed in foreground if the management unit determines that the second task group expects the return of information from the first task group,
wherein the management unit manages the second task group in a second chain different from the first chain and causes the second task group to be executed if the management unit determines that the second task group does not expect the return of information from the first group,
the management unit is capable of managing with a weak correlation the first task group as the first chain and is capable of managing the second task group as other second chain and executes the second task group in the foreground,
wherein, if the management unit manages with the strong correlation a plurality of task groups to be included in one chain, the management unit manages each task group with a second order, and wherein, if the management unit manages with the weak correlation a plurality of task groups to be included in one chain, the management unit manages each task group with a third order.

12. A mobile terminal according to claim 11, wherein, if the task executing unit receives a fourth request for executing a receiving call after the receiving call is interrupted, while the management unit manages the plurality of chains,
the management unit manages a task of the receiving call as a new chain, with the highest order of priority and executes in background a task which is executed before the receiving call is interrupted.

13. A mobile terminal according to claim 11, wherein, if a fifth request for executing a task of mail receiving function is received from the task executing unit after the mail receiving is interrupted, while the management unit manages the plurality of chains,
the management unit manages a task of the mail receiving as a new chain with the highest order of priority and executes in background a task which is executed before the mail receiving is interrupted.

14. A mobile terminal according to claim 13, wherein the management unit determines whether or not the mail receiving is capable of interrupting against a task which is executed in foreground before the mail receiving is interrupted, and
wherein, if the management unit determines that the mail receiving is incapable of interrupting, the management unit executes a mail receiving function in background and manages the mail receiving function having a second order of priority.

* * * * *